US012321344B2

(12) United States Patent
Bhandari et al.

(10) Patent No.: US 12,321,344 B2
(45) Date of Patent: Jun. 3, 2025

(54) EXECUTING AGGREGATE COMPUTING OPERATIONS IN COMPLEX COMPUTING NETWORKS

(71) Applicant: Veeva Systems Inc., Pleasanton, CA (US)

(72) Inventors: Pukar Bhandari, San Ramon, CA (US); Graham Gelwicks, San Francisco, CA (US); Andrew Han, Needham, MA (US); Peter Gassner, Pleasanton, CA (US)

(73) Assignee: Veeva Systems Inc., Pleasanton, CA (US)

( * ) Notice: Subject to any disclaimer, the term of this patent is extended or adjusted under 35 U.S.C. 154(b) by 0 days.

(21) Appl. No.: 18/230,568

(22) Filed: Aug. 4, 2023

(65) Prior Publication Data

US 2024/0045859 A1 Feb. 8, 2024

Related U.S. Application Data

(60) Provisional application No. 63/395,298, filed on Aug. 4, 2022.

(51) Int. Cl.
*G06F 16/00* (2019.01)
*G06F 16/22* (2019.01)
(Continued)

(52) U.S. Cl.
CPC .......... *G06F 16/244* (2019.01); *G06F 16/221* (2019.01); *G06F 16/283* (2019.01)

(58) Field of Classification Search
CPC ............. G06F 2201/84; G06F 11/3006; G06F 16/2365; G06F 16/24556; G06F 16/2471; G06F 16/254; G06F 16/248; G06F 16/258; G06F 16/27; G06F 16/284; G06F 16/951; G06F 16/958; G06F 2201/80; G06F 2201/805; G06F 11/328; G06F 16/23; G06F 16/25; G06F 11/34; G06F 16/21; G06F 16/275; G06F 16/1794; G06F 16/24568;
(Continued)

(56) References Cited

U.S. PATENT DOCUMENTS 11,516,069 B1 * 11/2022 Satish .................. H04L 43/067
2017/0286510 A1 * 10/2017 Horowitz ........... G06F 16/2471

* cited by examiner

*Primary Examiner* — Shyue Jiunn Hwa
(74) *Attorney, Agent, or Firm* — Baker & McKenzie LLP

(57) ABSTRACT

Systems and methods are provided for executing aggregate computing operations for a computing report without modifying records used to generate the computing report in a computing network. An exemplary method includes: receiving a selection of records from one or more available records; receiving a selection of an aggregate computing operation from one or more first computing operations; receiving a request for generating a first computing report based on the records; generating the first computing report comprising one or more first computing operation results; executing the aggregate computing operation on the one or more first computing operation results, thereby resulting in one or more second computing operation results, wherein the executing of the aggregate computing operation on the records does not modify the records; and transmitting the first computing report for display on a second user interface, the first computing report comprising the one or more second computing operation results.

26 Claims, 17 Drawing Sheets

(51) Int. Cl.
*G06F 16/242* (2019.01)
*G06F 16/28* (2019.01)

(58) Field of Classification Search
CPC ........ G06F 16/9024; G06F 8/10; G06F 8/433; G06F 9/44505; G06F 9/4494; G06F 8/00; G06F 8/34; G06F 11/1402; G06F 11/2094; G06F 11/3409; G06F 16/217; G06F 16/245; G06F 16/24569; G06F 16/28; G06F 8/30; G06F 8/35; G06F 9/46; H04L 5/00; H04L 12/00; H04L 43/00
See application file for complete search history.

PREVIEW: Facility Production w/ Error Rate Std Deviation
*Includes both Std dev and Distinct List function*

▼ PROPERTIES
Report Type Production Quantity

▶ FILTERS (0)

*Expand all  Collapse all*

Production Quantity (8)

| Name | Factory ▼ | Production Tally Date | Total Production | | Production Error | | Error Rate | |
|---|---|---|---|---|---|---|---|---|
| ▲ Production Tally Date (Month) : **2022 Mar (1)** | Factory Name 1 | Max: 01 Mar 2022 | Sum: | 111 | Std Dev: | 0 | Avg Dev: | 0.41 |
| ▲ Production Tally Date (Month) : **2022 Apr (2)** | Factory Name 1, Factory Name 2 | Max: 01 Apr 2022 | Sum: | 992 | Std Dev: | 0 | Avg Dev: | 0.01 |
| ▲ Production Tally Date (Month) : **2022 May (5)** | Factory Name 1, Factory Name 2, Factory Name 2, Factory Name 4, Factory Name 5 | Max: 18 May 2022 | Sum: | 2,698 | Std Dev: | 22 | Avg Dev: | 0.16 |
| ▲ All Production Tally Date (Month) : **8** | Factory Name 1, Factory Name 2, Factory Name 2, Factory Name 3, Factory Name 4, Factory Name 5 | Max: 18 May 2022 | Sum: | 3,801 | Std Dev: | 25 | Avg Dev: | 0.15 |

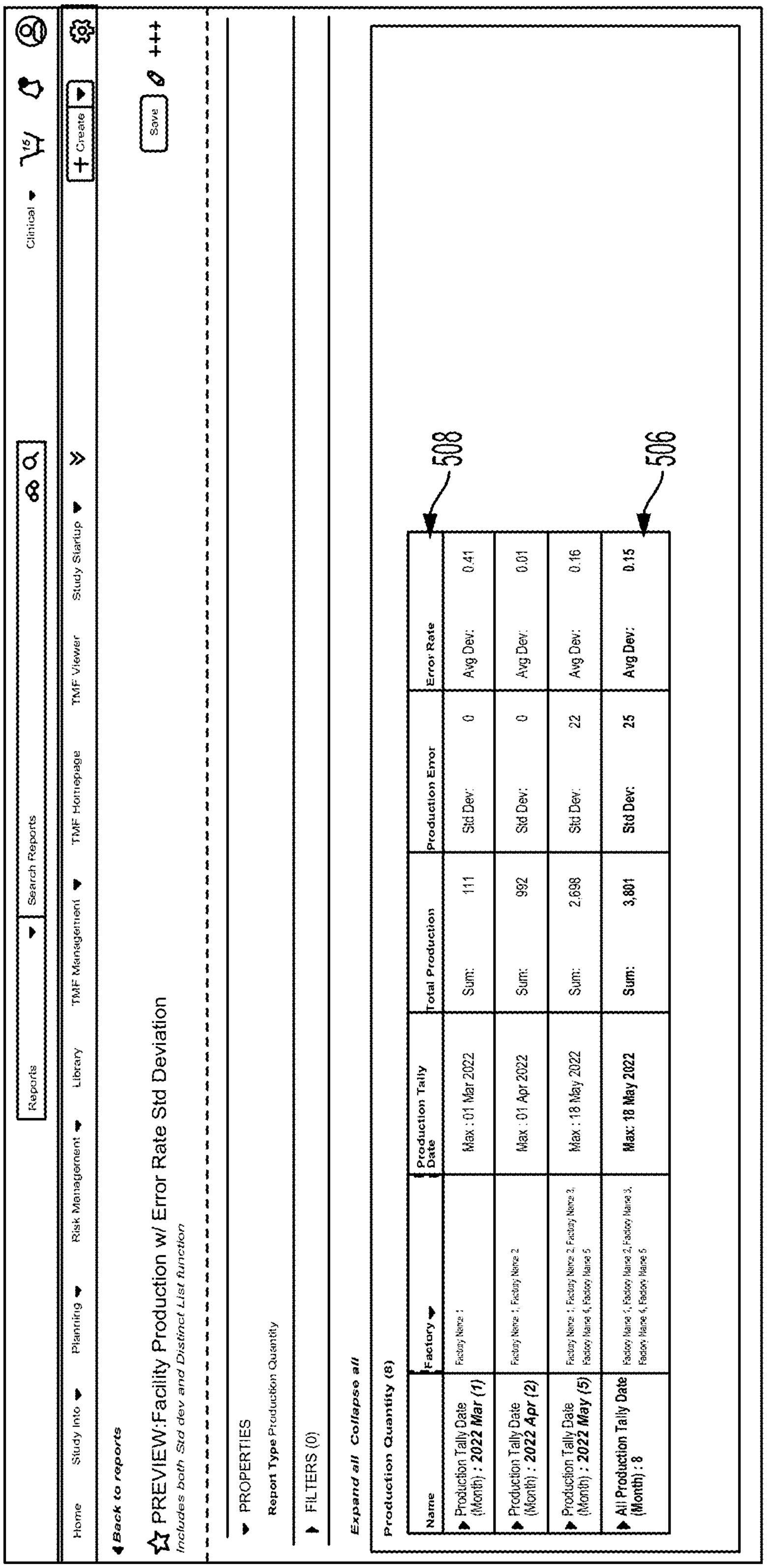

FIG. 5B

| Home | Study Info ▶ | Planning ▶ | Risk Management ▶ | Reports ▶ | Library | TMF Management ▶ | Search Reports | TMF Homepage | TMF Viewer | Study Startup ▶ | Clinical ▶ |

◀ Back to reports

☆ PREVIEW:Facility Production w/ Error Rate Std Deviation
*Includes both Std dev and Distinct List function*

▼ PROPERTIES
Report Type Production Quantity

▶ FILTERS (0)

Expand all  Collapse all

Production Quantity (8)

| Name | Factory ▶ | Production Tally Date | Total Production | | Production Error | | Error Rate | |
|---|---|---|---|---|---|---|---|---|
| ▲ Production Tally Date (Month) : **2022 Mar (1)** | Factory Name 1 | Max: 01 Mar 2022 | Sum: | 111 | Std Dev: | 0 | Std Dev Samp: | |
| ▲ Production Tally Date (Month) : **2022 Apr (2)** | Factory Name 1, Factory Name 2 | Max: 01 Apr 2022 | Sum: | 992 | Std Dev: | 0 | Std Dev Samp: | 0.00 |
| ▲ Production Tally Date (Month) : **2022 May (5)** | Factory Name 1, Factory Name 2, Factory Name 3, Factory Name 4 | Max: 18 May 2022 | Sum: | 2,698 | Std Dev: | 22 | Std Dev Samp: | 0.22 |
| ▲ All Production Tally Date (Month) : 8 | Factory Name 1, Factory Name 2, Factory Name 3, Factory Name 4, Factory Name 5 | Max: 18 May 2022 | Sum: | 3,801 | Std Dev: | 25 | Std Dev Samp: | 0.20 ← 514 |

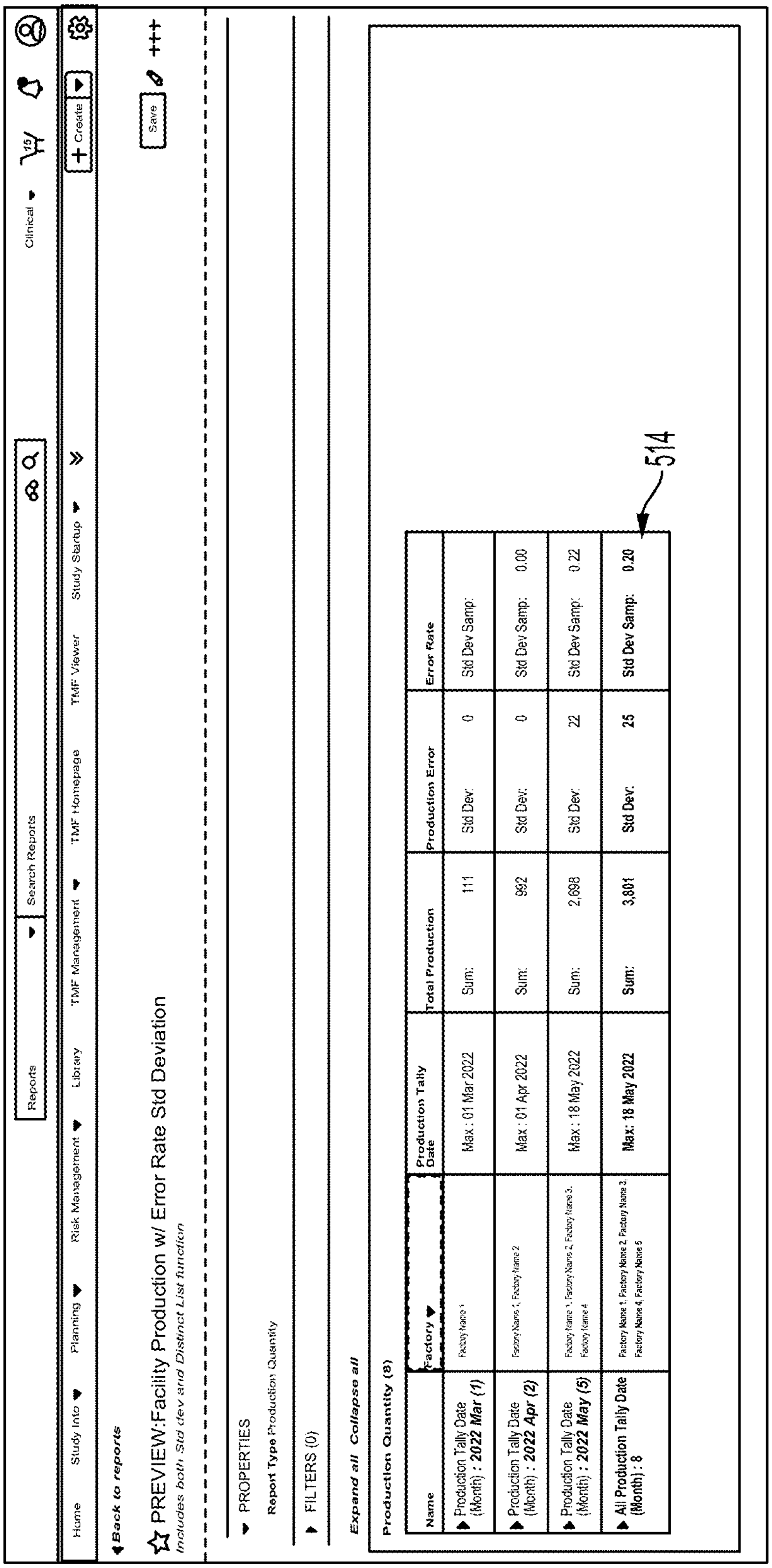

FIG. 5D

EXECUTING AGGREGATE COMPUTING OPERATIONS IN COMPLEX COMPUTING NETWORKS

CROSS-REFERENCE TO RELATED APPLICATIONS

This application claims priority to U.S. Provisional Application No. 63/395,298, filed on Aug. 4, 2022, titled "Executing Aggregate Computing Operations In Complex Computing Networks," which is incorporated herein by reference in its entirety for all purposes.

TECHNICAL FIELD

The present disclosure relates to methods and systems for executing computing operations in complex computing networks.

BACKGROUND

Researchers, scientists, industry players, academics, government regulators, and other stakeholders are increasingly in need of tracking and executing operations on data across computer networks.

SUMMARY

According to one aspect of the subject matter described in this disclosure, a method for executing aggregate computing operations for a computing report without modifying records used to generate the computing report in a computing network is provided. The method includes the following: receiving, receiving, using one or more computing device processors, via a first user interface of a computing device, records; receiving, using the one or more computing device processors, via the first user interface of the computing device, a selection of an aggregate computing operation from one or more first computing operations, the one or more first computing operations comprising a first aggregate computing operation, a second aggregate computing operation, a first aggregate listing operation, and a second aggregate listing operation; and receiving, using the one or more computing device processors, via the first user interface of the computing device, a request for generating a first computing report based on the records; in response to receiving the request for generating the first computing report based on the records: accessing, using the one or more computing device processors, the records from a database comprising the records; generating, using the one or more computing device processors, one or more first computing operation results based on executing one or more second computing operations on the records, wherein the executing of the one or more second computing operations on the records does not modify the records; and generating, using the one or more computing device processors, the first computing report comprising the one or more first computing operation results; executing, using the one or more computing device processors, the first aggregate computing operation on the one or more first computing operation results, thereby resulting in one or more second computing operation results, wherein the executing of the first aggregate computing operation on the one or more first computing operation results does not modify the records; transmitting, at a first time, using the one or more computing device processors, the first computing report for display on a second user interface of the computing device, different from the first user interface of the computing device, wherein the first computing report comprises the one or more second computing operation results; receiving, using the one or more computing device processors, via the first user interface of the computing device, an option for removing the one or more second computing operation results from the first computing report; transmitting, at a second time, using the one or more computing device processors, the first computing report for display on the second user interface of the computing device, different from the first user interface of the computing device, wherein the first computing report does not comprise the one or more second computing operation results; receiving, using the one or more computing device processors, via the first user interface or a third user interface of the computing device, a parameter for filtering the one or more first computing operation results from the first computing report, or the one or more second computing operation results from the first computing report; filtering, using the one or more computing device processors, the first computing report based on the parameter; and transmitting, at a third time, using the one or more computing device processors, based on the filtering of the first computing report based on the parameter, the first computing report for display on the second user interface of the computing device or the third user interface of the computing device, different from the first user interface of the computing device, wherein the records are available for generating a second computing report different from the first computing report. As described in this disclosure, in some embodiments, the first computing report is equivalent to a first report. In some embodiments, the records are selected from one or more available records. In some embodiments, the one or more first computing operations further comprise a first aggregate listing operation and a second aggregate listing operation.

According to another aspect of the subject matter described in this disclosure, a system for executing aggregate computing operations for a computing report without modifying records used to generate the computing report in a computing network is provided. The system includes one or more computing device processors and a non-transitory computer readable storage medium storing code for execution by the one or more computing device processors. The code includes instructions to: receive via a first user interface, a selection of records from one or more available records; receive via the first user interface, a selection of an aggregate computing operation from one or more first computing operations, the one or more first computing operations comprising a first aggregate computing operation, a second aggregate computing operation, a first aggregate listing operation, and a second aggregate listing operation; receive via the first user interface, a request for generating a first computing report based on the records; in response to receiving the request for generating the first computing report based on the records: access the records from a database comprising the records; generate one or more first computing operation results based on executing one or more second computing operations on the records, wherein the executing of the one or more second computing operations on the records does not modify the records; and generate the first computing report comprising the one or more first computing operation results; execute the aggregate computing operation on the one or more first computing operation results, thereby resulting in one or more second computing operation results, wherein the executing of the aggregate computing operation on the records does not modify the records; transmit, at a first time, the first computing report for display on a second user interface, different from the first user interface, wherein the first computing report comprises the one or more second computing operation results; receive via the first user interface, an option for removing the one or more second computing operation results from the first computing report; transmit, at a second time, the first computing report for display on the second user interface, different from the first user interface, wherein the first computing report does not comprise the one or more second computing operation results; receive, via the first user interface or a third user interface, a parameter for filtering one or more of the one or more first computing operation in from the first computing report, or the one or more second computing operation results in the first computing report; filter the first computing report based on the parameter; and transmit, at a third time, based on the filtering of the first computing report based on the parameter, the first computing report for display on the second user interface or the third user interface, different from the first user interface, wherein the records are available for generating a second computing report different from the first computing report.

According to another aspect of the subject matter described in this disclosure, a method for executing aggregate computing operations for a computing report without modifying records used to generate the computing report in a computing network is provided. The method includes the following: receiving, using one or more computing device processors, via a first user interface of a computing device, records; receiving, using the one or more computing device processors, via the first user interface of the computing device, a selection of an aggregate computing operation from one or more first computing operations, the one or more first computing operations comprising a first aggregate computing operation, a second aggregate computing operation, a first aggregate listing operation, and a second aggregate listing operation; receiving, using the one or more computing device processors, via the first user interface of the computing device, a request for generating a first computing report based on the records; in response to receiving the request for generating the first computing report based on the records: accessing, using the one or more computing device processors, the records from a database comprising the records; generating, using the one or more computing device processors, one or more first computing operation results based on executing one or more second computing operations on the records, wherein the executing of the one or more second computing operations on the records does not modify the records; and generating, using the one or more computing device processors, the first computing report comprising the one or more first computing operation results; executing, using the one or more computing device processors, the first aggregate computing operation on the one or more first computing operation results, thereby resulting in one or more second computing operation results, wherein the executing of the first aggregate computing operation on the one or more first computing operation results does not modify the records; transmitting, at a first time, using the one or more computing device processors, the first computing report for display on a second user interface of the computing device, different from the first user interface of the computing device, wherein the first computing report comprises the one or more second computing operation results; receiving, using the one or more computing device processors, via the first user interface of the computing device, an option for removing the one or more second computing operation results from the first computing report; and transmitting, at a second time, using the one or more computing device processors, the first computing report for display on the second user interface of the computing device, different from the first user interface of the computing device, wherein the first computing report does not comprise the one or more second computing operation results, wherein the records are available for generating a second computing report different from the first computing report.

BRIEF DESCRIPTION OF THE DRAWINGS

The disclosure is illustrated by way of example, and not by way of limitation in the figures of the accompanying drawings in which like reference numerals are used to refer to similar elements. The various elements shown in the figures that follow may be optional depending on a given embodiment without departing from the principles provided in this disclosure.

FIG. 5B illustrates an example interface with a third report, according to some embodiments of the present disclosure.

FIG. 5D illustrates an example interface with a fourth report, according to some embodiments of the present disclosure.

Figure 1A:
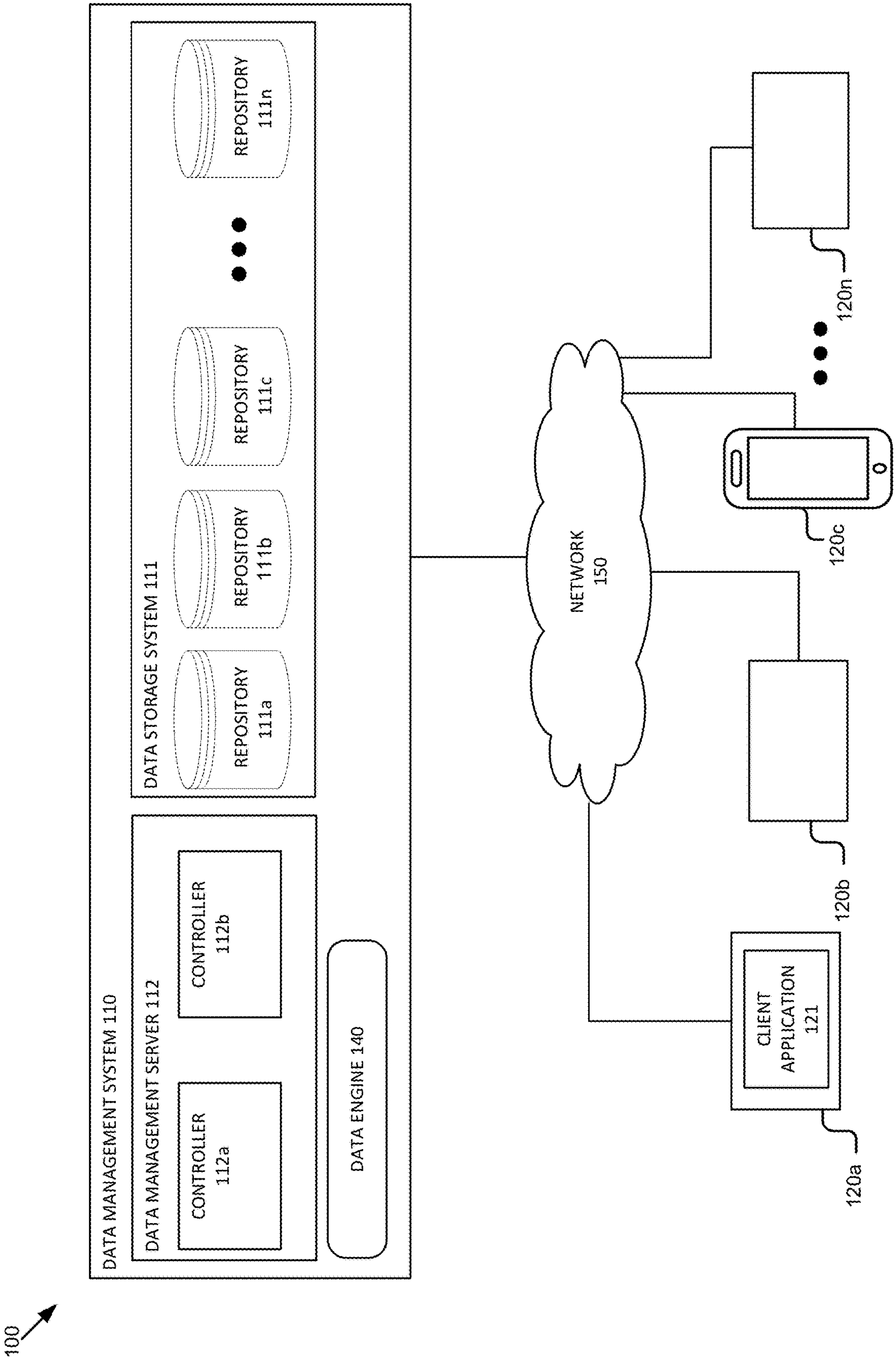
FIG. 1A illustrates an example high level block diagram of a data management architecture wherein the present technology may be implemented according to some embodiments of the present disclosure.

Although similar reference numbers may be used to refer to similar elements for convenience, it can be appreciated that each of the various example embodiments may be considered to be distinct variations. As used in this disclosures, the terms "embodiment" and "example embodiment" do not necessarily refer to a single embodiment, although it may, and various example embodiments may be readily combined and interchanged, without departing from the scope or spirit of the present disclosure. Furthermore, the terminology as used herein is for the purpose of describing example embodiments only, and are not intended to be limitations. In this respect, as used herein, the term "in" may include "in" and "on," and the terms "a," "an" and "the" may include singular and plural references. Furthermore, as used herein, the term "by" may also mean "from," depending on the context. Furthermore, as used herein, the term "if" may also mean "when" or "upon," depending on the context. Furthermore, as used herein, the words "and/or" may refer to and encompass any and all possible combinations of one or more of the associated listed items.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context.

Data management systems generally support several aggregate functions in reporting such as sum, average, minimum, and max for numbers, distinct count for identifier (ID) and count columns, and min and max for date and date-time fields. These functions may be applied when a report includes a grouping. To improve the reporting functionality, other aggregate functions such as "List" or "Distinct List" to concatenate values from a group into a single string may also be utilized. Additionally, more aggregate functions such as "Median," "Standard Deviation (Std Dev)," or "Sample Standard Deviation (Std Dev Samp)" may be utilized.

Without these aggregate functions, the user may be entailed to perform the calculations or functions in an external tool when the data is exported, or similar features may be entailed to be introduced targeting a particular object or data set instead of having universal application. This way, the additional export, maintenance, and/or tracking of the data would be cumbersome for the user. Furthermore, lacking these aggregate functions may entail other objects and/or complex application features to be introduced to track and perform the calculations performed by these aggregate functions.

A user or customer may apply the aggregate functions directly to a report or group report instead of the underlying data used to generate the report in an embodiment. A group report may comprise one or more groups of data or values. The values may be grouped by a predetermined parameter, e.g. name of a factory or production quantity. An application, e.g., a reports engine or reporting function (not shown in the figures), may perform these aggregate functions in real-time.

The user may apply these aggregate functions in real-time and remove them later as needed. As mentioned above, the calculation of the aggregate function is performed on the report results, which may be filtered and targeted based on user configurations. Performing one of these aggregate functions might not change the underlying data upon which the function is calculated. So the underlying data may remain as it is and/or available for generating a second report different from the report.

The user may choose a subset of data, e.g., from one or more objects, to generate a report and/or to apply the aggregate function. The data or the subset of data used to generate the report may be obtained on the user side in substantially real-time. The user may choose the subset of data in a report setup. Because a reporting function which generates reports may support complex queries, filtering, and formula fields to fetch and process the data, an aggregate function may be applied only to the subset of data that the user chose in the report setup. A formula field may use an formula language to calculate a result from other field values, a set of built-in functions, and/or math operators. The user may have one place to define, filter, and process the data, improving the user experience.

System Environment

FIG. 1A illustrates an example high level block diagram of a data management architecture 100 wherein the present technology may be implemented. As shown, the architecture 100 may include a data management system 110, and a plurality of user computing devices 120*a*, 120*b*, . . . 120*n*, coupled to each other via a network 150. The data management system 110 may include a data storage system 111 and a data management server 112. The data storage system 111 may have two or more repositories, e.g., 111*a*, 111*b*, 111*c*, . . . and 111*n*. The network 150 may include one or more types of communication networks, e.g., a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 120*a*, . . . 120*n* may be any machine or system that is used by a user to access the data management system 110 via the network 150, and may be any commercially available computing devices including laptop computers, desktop computers, mobile phones, smart phones, tablet computers, netbooks, and personal digital assistants (PDAs). A client application 121 may run from a user computing device, e.g., 120*a*, and access data in the data management system 110 via the network 150.

The data storage system 111 may store data that client applications (e.g., 121) in user computing devices 120*a* . . . 120*n* may access and may be any commercially available storage devices. Each content repository (e.g., 111*a*, 111*b*, 111*c*, . . . or 111*n*) may store a specific category of data, and allow users to interact with its data in a specific business context. It is appreciated that content repositories may be separate logic sections in a same storage device.

The data management server 112 is typically a remote computer system accessible over a remote or local network, such as the network 150. The data management server 112 may store a data management controller 112*a* and a data collection controller 112*b* for controlling management and collection of the data. The data management server 112 could be any commercially available computing devices. Although only one server is shown, it is appreciated that the data management system 110 may have a plurality of servers and the controllers 112*a* and 112*b* that may be in separate servers. A client application (e.g., 121) process may be active on one or more user computing devices 120*a*, . . . , 120*n*. The corresponding server process may be active on the data management server 112. The client application process and the corresponding server process may communicate with each other over the network 150, thus providing distributed functionality and allowing multiple client applications to take advantage of the information-gathering capabilities of the data management system 110. Moreover, the data engine 140 shown within the data management system 110 may include one or more units, including a data aggregation unit, a data cleaning unit, or a data transformation unit.

In one implementation, the architecture 100 may be used for collecting and managing data, e.g., trial data. In some embodiments, a trial as described in this disclosure may refer to a clinical trial. A first repository (e.g., 111*a*) may be used by a first sponsor (e.g., a pharmaceutical company) to store a first study design received from a first user computing device (e.g., 120*a*). The first study design may define the infrastructure and lifecycle of the study, and may comprise rules (e.g., for queries, derived values, notifications and displaying events, forms and items), a casebook (i.e., a doctor's binder), event groups, events (e.g., subject visits), forms which comprise segregate sections and fields, item groups and items. In one example, a study design may define a particular study, i.e., each subject may have ten visits, and each visit may have three forms. There may be a workflow associated with each visit, e.g., what needs to be done at each visit. In some embodiments, a subject may comprise or refer to one or more patients.

In one implementation, the first study design may be stored as definition objects in the first repository 111*a*, specifying what is required to happen on each site during the study. The first repository 111*a* may also store electronic records of the first study. In one implementation, the electronic records may be electronic data capture (EDC) data. Trial source data (e.g., associated with a subject) may be captured at the user computing devices, and the aggregated and obfuscated data may be stored as EDC data in the first repository 111*a*. The data management system 110 may have an interface for receiving EDC data collected in trials and a reporting tool for analysis of the EDC data.

The second repository 111*b* may be used by a first site (e.g., a hospital) of the first study to store trial source data from a second user computing device (e.g., 120*b*), and a third repository (e.g., 111*c*) may be used by a second site of the first study to store trial source data from a third user computing device (e.g., 120*c*). The trial source data (e.g., three blood pressure values of a subject taken during one visit) in the second repository 111*b* may be converted to EDC data (e.g., the average of the three blood pressure values) automatically, and then stored in the first repository 111*a* as EDC data. Similarly, the trial source data in the third repository 111*c* may be converted to EDC data automatically, and then stored in the first repository 111*a* as EDC data. In one implementation, the trial source data may be converted to the EDC data at the client application 121, and the EDC data is transmitted to the data management server 112. In one implementation, the trial source data may be transmitted to the repository 111*b* or 111*c* via the data management server 112, and converted to the EDC data at the data management server 112. The EDC data is then stored in the repository 111*a*. Data in the second repository 111*b* and the third repository 111*c* may be synchronized with that in the first repository 111*a* regularly or from time to time when new data entries are received from user computing devices. The first study design may be transmitted to the second repository 111*b* and the third repository 111*c*. The second repository and the third repository may be synchronized with the first repository for updates to the first study design.

In one implementation, the data management system 110 may be a multi-tenant system where various elements of hardware and software may be shared by one or more customers. For instance, a server may simultaneously process requests from a plurality of customers (e.g., sponsors, sites, etc.), and the data storage system 111 may store content for a plurality of customers (e.g., sponsors, sites, etc.). In a multi-tenant system, a user is typically associated with a particular customer. In one example, a user could be an employee of one of a number of pharmaceutical companies or trial sites which are tenants, or customers, of the data management system 110.

In one embodiment, the data management system 110 may run on a cloud computing platform. Users can access content on the cloud independently by using a virtual machine image, or purchasing access to a service maintained by a cloud database provider.

In one embodiment, the data management system 110 may be provided as Software as a Service ("SaaS") to allow users to access the data management system 110 with a thin client.

Figure 1B:
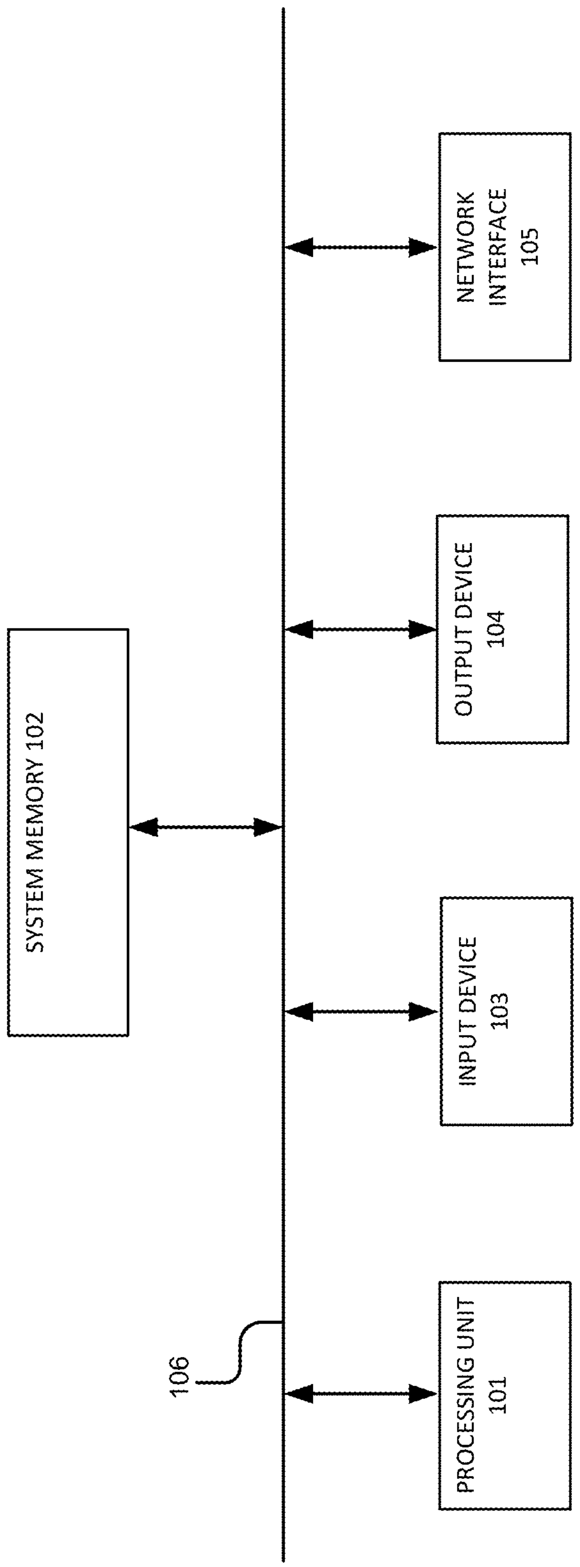
FIG. 1B illustrates an example block diagram of a computing device according to some embodiments of the present disclosure.

FIG. 1B illustrates an example block diagram of a computing device which can be used as the user computing devices 120*a*, . . . , 120*n*, and the data management server 112 in FIG. 1A. The illustrated computing device is only one example of a suitable computing environment and is not intended to suggest any limitation as to scope of use or functionality. The computing device of FIG. 1B may include a processing unit 101, a system memory 102, an input device 103, an output device 104, a network interface 105 and a system bus 106 that couples these components to each other.

The processing unit 101 may be configured to execute computer instructions that are stored in a computer-readable medium, for example, the system memory 102. The processing unit 101 may be a central processing unit (CPU).

The system memory 102 includes a variety of computer readable media which may be any available media accessible by the processing unit 101. For instance, the system memory 102 may include computer storage media in the form of volatile and/or nonvolatile memory such as read only memory (ROM) and/or random access memory (RAM). By way of example, but not limitation, the system memory 102 may store instructions and data, e.g., an operating system, program modules, various application programs, and program data.

A user can enter commands and information to the computing device of FIG. 1B through the input device 103. The input device 103 may be, e.g., a keyboard, a touchscreen input device, a touch pad, a mouse, a microphone, and/or a pen.

The computing device of FIG. 1B may provide its output via the output device 104 which may be, e.g., a monitor or other type of display device, a speaker, a printer, or some other output device.

The computing device of FIG. 1B, through the network interface 105, may operate in a networked or distributed environment using logical connections to one or more other computing devices, which may be a personal computer, a server, a router, a network personal computer (PC), a peer device, a smart phone, or any other media consumption or transmission device, and may include any or all of the elements described above. The logical connections may include a network (e.g., the network 150) and/or buses. The network interface 105 may be configured to allow the computing device of FIG. 1B to transmit and receive data in a network, for example, the network 150. The network interface 105 may include one or more network interface cards (NICs).

Figure 2:
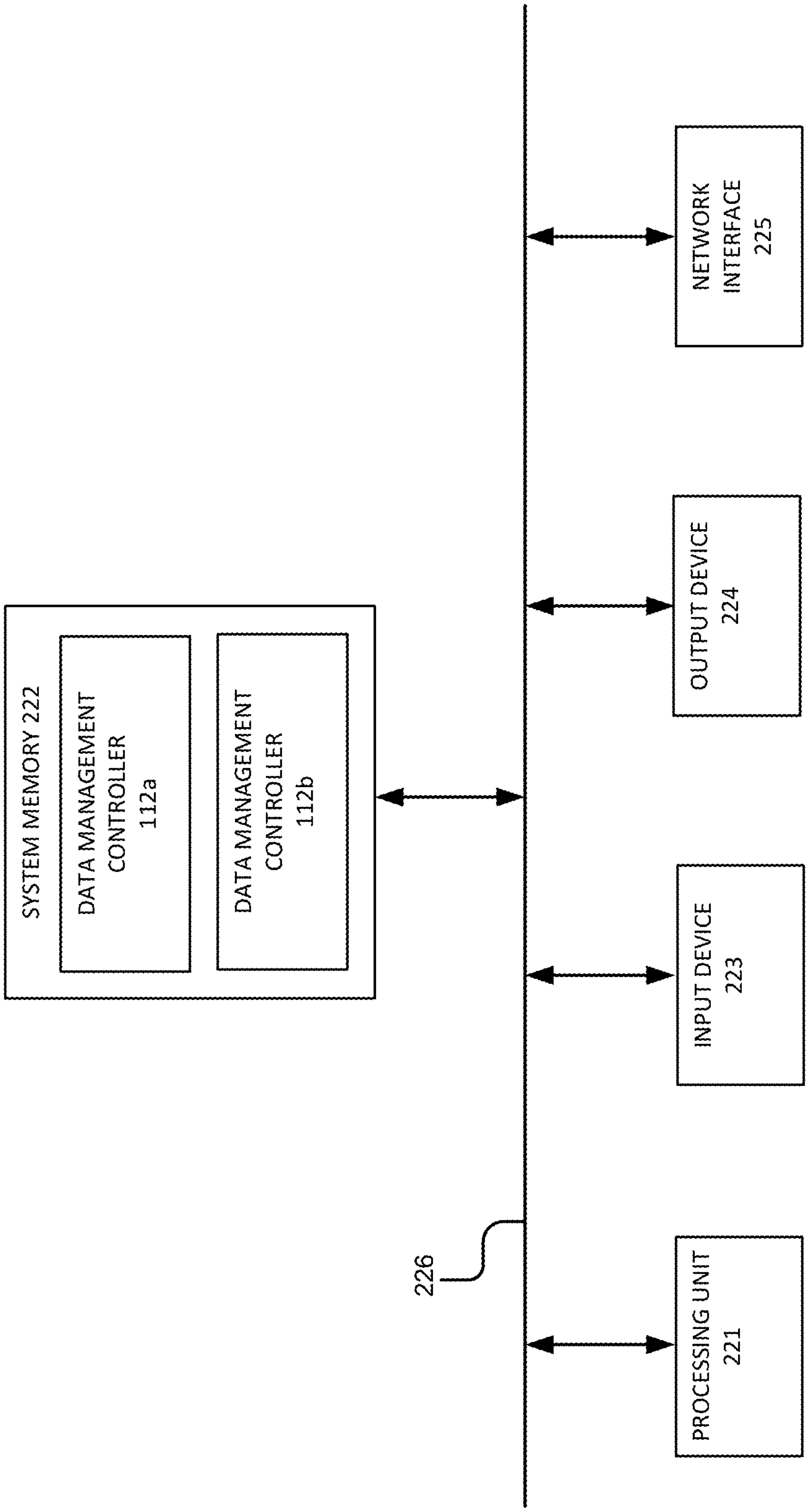
FIG. 2 illustrates an example high level block diagram of the data management server according to some embodiments of the present disclosure.

FIG. 2 illustrates an example high level block diagram of the data management server 112 according to one embodiment of the present disclosure. The data management server 112 may be implemented by the computing device of FIG. 1B, and may have a processing unit 221, a system memory 222, an input device 223, an output device 224, and a network interface 225, coupled to each other via a system bus 226. The system memory 222 may store a data management controller 112*a* and/or a data collection controller 112*b*.

In one implementation, the data management controller 112*a* may be a Java application. A sponsor user may design a study (e.g., a clinical study) via the data management controller 112*a* and store the study design as definition objects in a repository (e.g., 111*a*). A study design may have multiple elements, including a casebook, groups, events (e.g., subject visits), and forms which include sections, item groups, items, and fields to be filled out.

In one example, a trial is designed to evaluate subject response to a blood pressure medication. Participants on the medication may visit a trial site three times a week for consecutive six weeks. A workflow may be designed for each visit, and may include forms to be filled out, and measurements to be taken. In one example, a participant's blood pressure may be measured three times during each visit, stored in the data storage system (e.g., the repository 111*b*) as trial source data, and synchronized with other repositories in the data storage system 111 (e.g., the repository 111*a* for the sponsor). In one implementation, only aggregated and obfuscated data, without subject defining information, are sent to the sponsor repository (e.g., the repository 111*a*) and stored there as the EDC data.

A study design may have its own lifecycle. Once a sponsor completes a study design, a workflow may be executed to publish the study design to the participating trial sites (e.g., by storing the study design in trial site repositories such as repositories 111*b* and 111*c*) and the trial may enter its execution stage. If the study design is amended during the execution stage, the updates may be sent to the participating trial sites (e.g., by synchronizing the updates down to the trial site repositories 111*b* and 111*c*) for them to follow.

User Interfaces

When a request for generating a report based on a selection of records from one or more available records, the selected records from a database comprising the records may be accessed. One or more first computing operation result(s) may be generated based on executing one or more computing operations on the records. For example, the daily production quantities of some factories (i.e., selection of records) may be summed up (i.e., a computing operation) to generate a monthly production quantity for each of the factories (i.e., first computing operation results). The executing of the one or more computing operations on the records might not modify the records. In other words, the summing operation of the daily production quantities of the factories might not modify the daily production quantities of the factories. Then a report comprising the first computing operation result(s) may be generated. The report may be displayed in a table comprising a grid of cells arranged in rows and columns.

A selection of an aggregate computing operation may be received. The aggregate computing operation may comprise the List, the List Distinct, the Std Dev, or the Std Dev Samp function. The aggregate computing operation may be executed on the first computing operation result(s). For example, the List function may be applied to the monthly production quantities of the factories.

For example, a report or a group report may be generated by the data management architecture/system 100, e.g., by the data aggregation unit in the data engine 140, by another unit in the data engine 140, by a reporting function (not shown in the figures) of the data management system 110, or by a reporting function on the computing device 120*a*, . . . , or 120*n*. The report may be generated by the data management system 100 by accessing corresponding record(s) stored in a database or repository in the data storage system 111. The records or data may be stored in a relational database management system (RDBMS) and/or search indexes. When a user runs a report, a reports engine or reporting function may fetch the data from a plurality of sources. The records or data used to generate the report may be obtained at the user side in substantially real-time.

The records may be queried to intermediate tables where the data is stored for further processing. The reporting function operation might not change the underlying data. At least one of the further sorting, filtering, or grouping functions may be performed in the intermediate tables. Similarly, the reporting function may create formula fields and/or conditional fields and/or apply aggregate functions such as List and Standard Deviation in the tables. A conditional field may let a user set up labels based on other field values.

Then the data may be transferred into a comma-separated values (CSV) file. The CSV file's data may then be divided into smaller sizes and moved to JavaScript Object Notation (JSON) files. The CSV and/or JSON files may constitute the cache of the reporting function. The cache files may then be exported in various formats and/or may be used to write results in the user interface (UI) of the data management system 100. A reporting UI or "Report Export Writer" of the data management system 100 may use JSON files to write multiple, e.g., 2000, records at a time. These same cache files may be written in a single container file and/or transferred to multiple nodes to create a second cache for the data management server 112 or different data management servers.

The report may then directly be modified, processed, or manipulated with an aggregate function such as "List," "Distinct List," "Median," "Standard Deviation (Std Dev)," or "Sample Standard Deviation (Std Dev Samp)." Executing an aggregate function for the report may result in one or more second computing operation results. Document and object report types, including multi-pass, may be considered minimum viable products (MVPs) and supported with these aggregate functions in an embodiment. But in other embodiments, all report types may be supported with these aggregate functions.

Reports may be built based on other reports. Reports may be combined by selecting matching columns to SQL (Structured Query Language) or another programming language that is used to manage databases. This flexibility may allow a user to build reports that span wider across a data model, to filter or calculate metrics using calculated fields defined on the underlying reports, or to join objects that cannot be joined in standard reports. For example, a multi-pass reporting may allow building reports that collect more data by joining a combination of multiple reports, e.g., up to five reports together. The multi-pass functionality may allow applying a function later at a second time on the result obtained by applying the function at a first time. For example, the multi-pass functionality may apply the Std Dev function again on the result obtained by applying the Std Dev function. An MVP may be a launched application with minimal set of functionalities that may still have value for the end customer.

In an embodiment, when a user input is received, the one or more first computing operation results in the report may be updated, in substantially real-time, with or without re-executing the one or more second computing operations. And in response to modifying the one or more first computing operation results in the report, the second computing operation results in the report may be dynamically updated, in substantially real-time, without re-executing the aggregate computing operation.

The first column of the report may or might not support aggregate functions. A user may add, remove, or edit in another way the List, List Distinct, Median, Std Dev, and/or Std Dev Samp function on report views. For example, the user may move a column or use a formula field to add, remove, or edit in another way an aggregate function when the aggregate function returns its result. These functions may be turned on by default or automatically but may be turned off by the user.

In an embodiment, an aggregated value may be calculated by a corresponding aggregate function after every run, e.g., when generating a group report, and may be stored like other aggregated values such as the sum, average, minimum, and max.

Various delimiter or separator options such as comma, next line, semi-colon, and pipe may be supported in the aggregate functions. For example, the result of an aggregate function may be shown in a grouped row as a concatenated text of all the rows' values in that group, e.g., separated by a delimiter such as a comma and space (", ").

Table I shows an example list of data types that may be supported with the aggregate functions by the data management system 100. MVP types may have a higher priority than non-MVP types. Data types that may entail post-processing are marked as non-MVP.

TABLE I

| Priority | Data Types | Examples |
|---|---|---|
| MVP | Text, ID, Document ("Doc") number | Text—"String" ID—3453 Doc numbers:—VV-0123 |
| MVP | Picklist, Lifecycle State, Document Status | Multi-value picklist—"Pick1, Pick2, Pick3", "Pick1, Pick2" |
| Non-MVP | Number, Decimal, Boolean | Decimals: 0.1, 0.11, Boolean—Yes/No |
| Non-MVP | Date, Date-time | Date: 01/22/13 Date-Time: 04 May 2021 8:55 PM PDT |
| MVP | Conditional Fields, Formula Fields | |
| MVP | Object reference fields, Document Reference Fields | |
| Non-MVP | User and group fields | |
| Non-MVP | Long Fields, Rich Text | |

The function of List or Distinct List may be presented to the user when a report is grouped along with other aggregate functions, if available. In an embodiment, only one of the List or Distinct List function may be selected at once, as shown as the Distinct List 308 in FIG. 3A and the List 404 in FIG. 4A, respectively. After hitting the "Run" button 320 shown in FIG. 3B, the List or Distinct List function is applied to or executed for the report and the result is shown as the Factory distinct list result 326 in FIG. 3C and the Factory list result 426 in FIG. 4B, respectively. In other words, executing the aggregate computing operation on the one or more first computing operation results (i.e., the monthly production quantity of factories) may result in one or more second computing operation results, e.g., the Factory distinct list result 326 in FIG. 3C or the Factory list result 426 in FIG. 4B.

As can be seen, the Distinct List or List function may return a concatenated list of results in a single string in a single cell of a data structure, e.g., by concatenating values of multiple rows in a group into a single cell. The data structure may be a table comprising a grid of cells arranged in rows and columns as shown in FIGS. 3C and 4B. For example, the Distinct List or List function may generate and display a string of factory names in a single cell instead of displaying each factory name in a separate row, thus improving readability of the report. The table may be stored in at least one of the computing device 120*a*, . . . , or 120*n* on which the request to generate the report is received, a database comprising the records (e.g., the content repository 111*a*, 111*b*, 111*c*, . . . or 111*n*), or another database.

As discussed above, various delimiter or separator options such as comma, next line, semi-colon, and pipe may be supported in the aggregate functions. Here in FIGS. 3C and 4B, the comma is used to separate values in each group of factory names.

The maximum number of characters returned by List or Distinct List may be the same or may vary. The maximum number of characters returned may be as high as can be reasonably technically supported. For example, the maximum number of characters may be 1024. If all text cannot be included, an ellipsis ". . . " may be displayed similar to a long text scenario for List or Distinct List results. All fields of List or List Distinct may be exported. Users may choose to review the entire List and List Distinct field values. The list function or the distinct list function may make it easier to export data in a readable way.

The sorting order of the generated list or distinct list may be the same as the report while this might not apply to down objects. A down object may be a child object, simple join object, an object related through a reference relationship, or related documents. The text for List or Distinct List may be displayed alphabetically (e.g., ascending) while numbers and dates may be displayed from smallest to largest (e.g., ascending). Alternatively, the result of the List or Distinct List function may be displayed in a descending order, e.g., descending alphabetic order or from largest to smallest for numbers.

The Distinct List function may be similar to the List function but may remove the duplicate values or data in a group. In other words, Distinct List function might not return duplicate values. In an embodiment, the Distinct List function may eliminate duplicate values in the group before concatenating the values. Comparing the factory distinct list 326 in FIG. 3C with the factory list 426 in FIG. 4B, it could be seen that the factory distinct list 326 does not include duplicate values, i.e., duplicate factory names, while the factory list 426 includes duplicate factory names.

For multi-pass (MP) reports, join fields might not be allowed if the grouping includes List and List Distinct aggregations. In an embodiment, if a column has List and List Distinct as aggregate functions, they might not be presented as a join field on a multi-pass report. If the field is already used as a join field, List and List Distinct may be disabled on the aggregate function dropdown list.

Similar to other aggregate functions, Std Dev, Std Dev Samp, and Median may be available to be shown on the dashboard of the user interface of the data management system 100. The Median function may support MVP and/or Non-MVP data types. The Median function may return the midpoint value from a distribution. If the number of items is even, the median is the average between the two middle numbers. In an embodiment, Median may only be available for number field types.

The Std Dev or Std Dev Samp function may return the standard deviation for a distribution. When Std Dev is applied to the one or more first computing operation results of the report in the abovementioned factory production quantity example, Std Dev is applied to a full range of the one or more first computing operation results, e.g., the monthly production quantities of the factories. Conversely, when Std Dev Samp is applied to the one or more first computing operation results of the report, Std Dev is applied to a partial contiguous or non-contiguous range (e.g., randomly picked samples) of the one or more first computing operation results.

In an embodiment, both Std Dev and Std Dev Samp functions may only be available for number field types. The Std Dev may calculate a standard deviation using the following formula:

$$\sigma = \sqrt{\frac{\sum (X-\mu)^2}{n}},$$

where σ denotes a population standard deviation,

Σ denotes a sum,

X denotes a population record,

μ denotes a population mean, and n denotes the number of records in the population.

The Std Dev Samp may calculate a sample standard deviation using the following formula:

$$s = \sqrt{\frac{\sum (X-\overline{X})^2}{n-1}},$$

where s denotes the sample standard deviation,

Σ denotes a sum,

X denotes a sample record, $\overline{X}$ denotes a sample mean, and n denotes the number of records in the sample.

In an embodiment, the population mean and population mean may be calculated in the same way:

| Population Mean | Sample Mean |
|---|---|
| $\mu = \frac{\sum_{i=1}^{N} x_i}{N}$ | $\overline{X} = \frac{\sum_{i=1}^{n} x_i}{n}$ |

The Std Dev and/or Std Dev Samp function may support alerts where one period's standard deviation is a greater than a predetermined benchmark or threshold. This may be accomplished via the multi-pass reporting function.

Table II shows an example list of report type priorities.

TABLE II

| Priority | Report Types | Other | Comments |
|---|---|---|---|
| 1 | Object | MP, Tabular | MVP, Match document report may be included. Matrix might not be supported across all report types. |
| 2 | Document | MP, Tabular | MVP |
| 3 | Workflow | MP, Tabular | Non-MVP |
| 4 | EDL | MP, Tabular | Non-MVP |
| 5 | Read and Understood | Tabular | Non-MVP |
| 6 | Binder | MP, Tabular | Non-MVP |
| 7 | Relationship | MP, Tabular | Non-MVP |
| 8 | Distribution | Tabular | Non-MVP |

Report Type may determine the "reporting objects" for the new report. For example, "Document" may mean that the report looks at documents as records while "Product with Campaign" may mean that the report looks at "Product and Campaign" records. When a user creates a new report, the first step may be selecting a report type for it. The data management system 100 may include standard, default report types, which are not editable, but may also allow users or administers of the data management system 100 to create custom report types, e.g., by combining multiple objects and views.

Users may filter and/or group data that is used to generate a report. Similarly, users may create report-only fields such as formula fields and conditional fields combining and manipulating data in the report. One of the benefits of grouping the data or reports may include that the customer can calculate metrics across records, such as record counts, sums, standard deviations, lists, averages, minimums, and maximums.

List, List Distinct, Std Dev, and Std Dev Samp may be supported for object and document ("doc") report types. This may include object with doc, matched document, and/or document with object types. The object with doc type may show the data management system 100 object records for a specific object as unique records and may allow a user to use document fields. The matched document type may be a multi-pass report that shows all documents matched to the user in the "created by" field. The document with object type may show documents as unique records and allow the user to use specific object fields as well as document fields. Lower priority of the types that may be supported with List, List Distinct, Std Dev, and Std Dev Samp may include document ("doc") role and/or doc with rendition. The doc with rendition type may show documents as unique records and allow the user to use document renditions fields.

Rendering of a multi-dimensional visualization of the report or computing report may be initiated, using the one or more computing device processors. And formatting of the multi-dimensional visualization, may be initiated, using the one or more computing device processors, based on an instruction received from the computing device, to enable controlling of the multi-dimensional visualization. The instruction may comprise a parameter of a data structure in which the computing report is comprised or displayed.

Figure 3A:
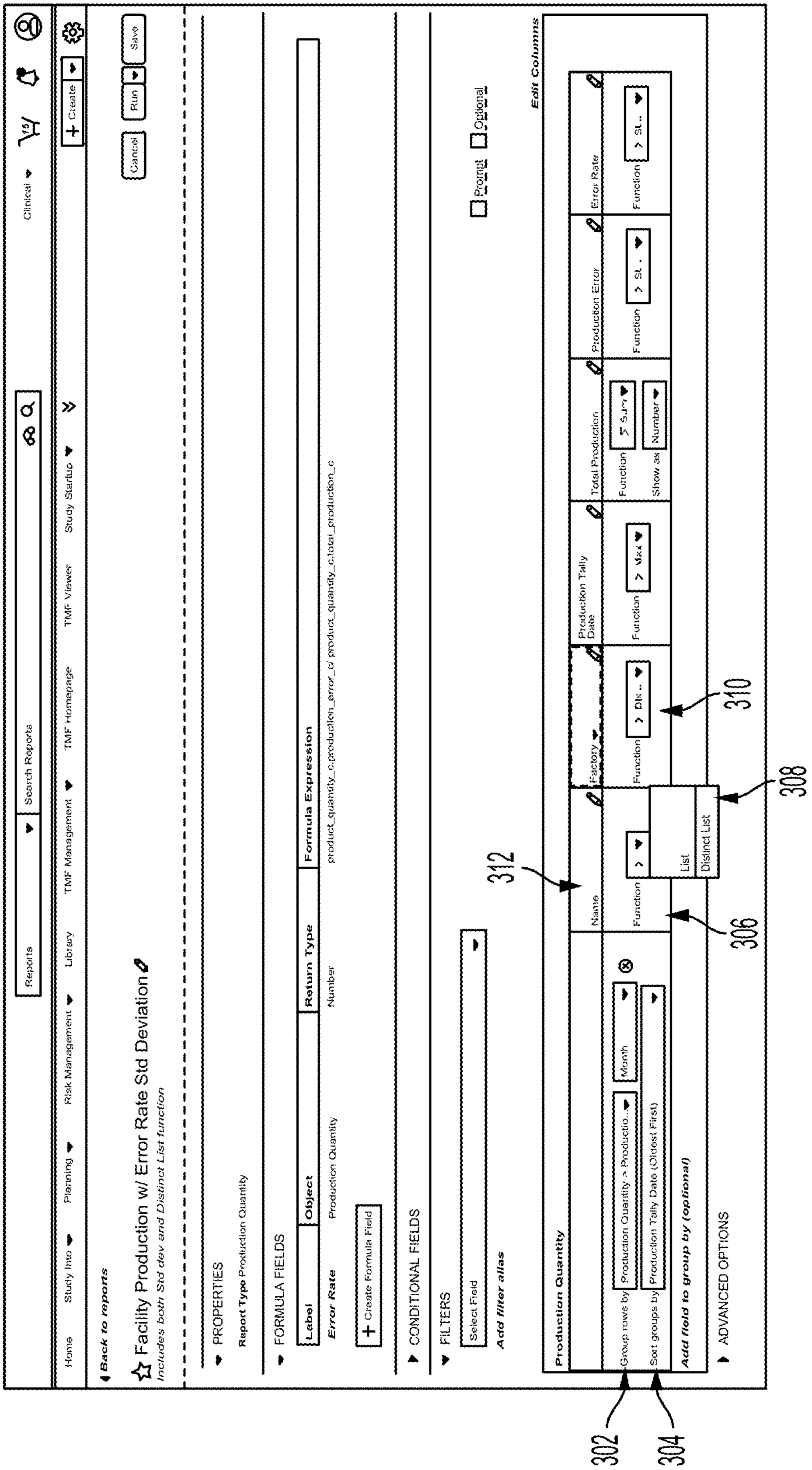
FIG. 3A illustrates an example interface used to generate a distinct list for a report, according to some embodiments of the present disclosure.

FIG. 3A illustrates an example interface used to generate a distinct list in a group report. The "Group rows by" dropdown window 302 may enable a user to choose a parameter to group rows by and the "Sort group by" dropdown window 304 may enable the user to choose the sorting order of the group. For example, the user may choose to group rows by production quantity and sort the group by production tally date (e.g., oldest first) 324 as in FIG. 3C. The user may choose between a List and Distinct List 308 for the function icon 306 under a first column, Name 312. Alternatively or additionally, the user may choose between the List and Distinct List functions 310 under a second column, Factory.

Figure 3B:
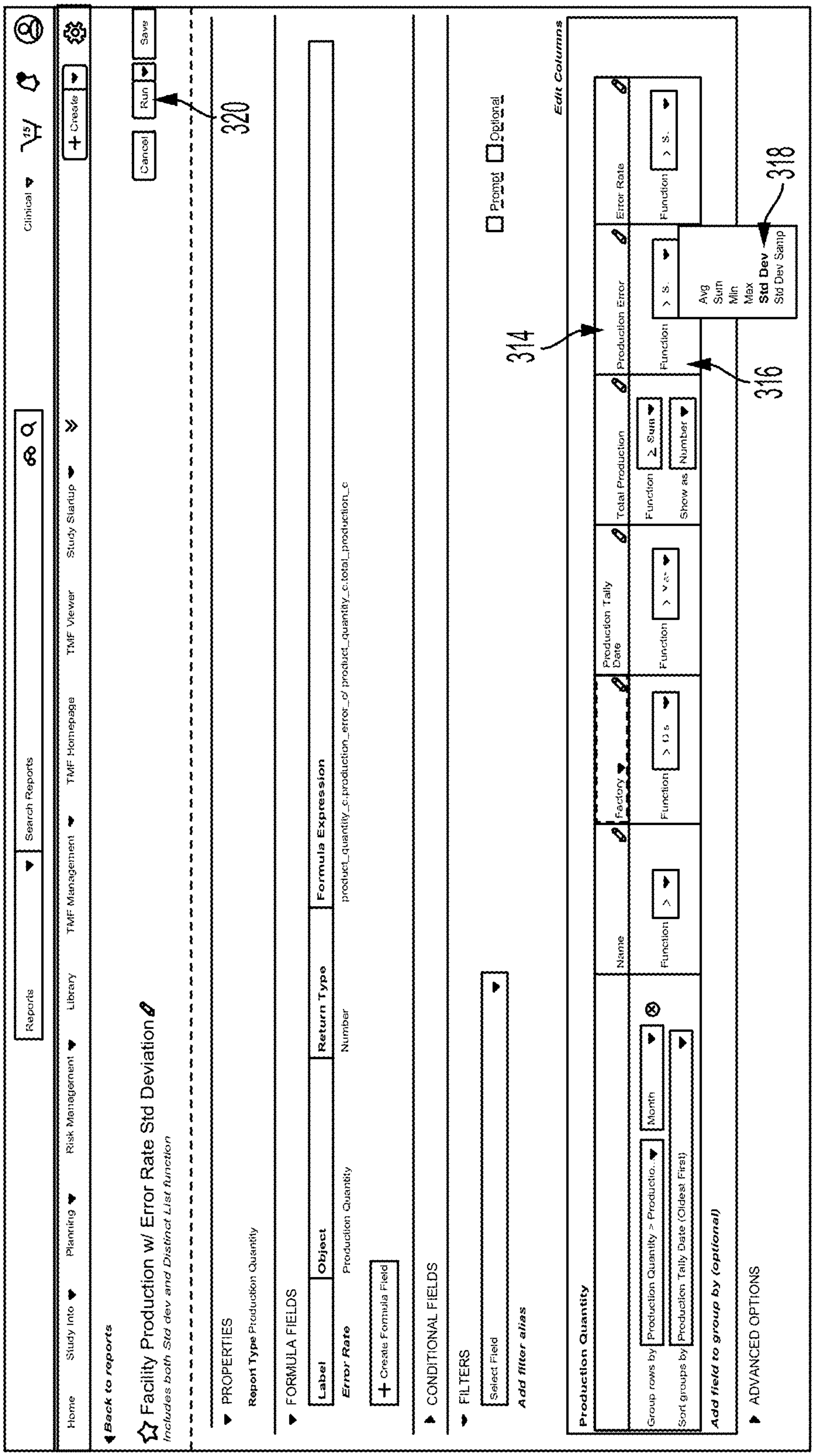
FIG. 3B illustrates an example interface used to generate a standard deviation in error rate function for a report, according to some embodiments of the present disclosure.
Figure 3C:
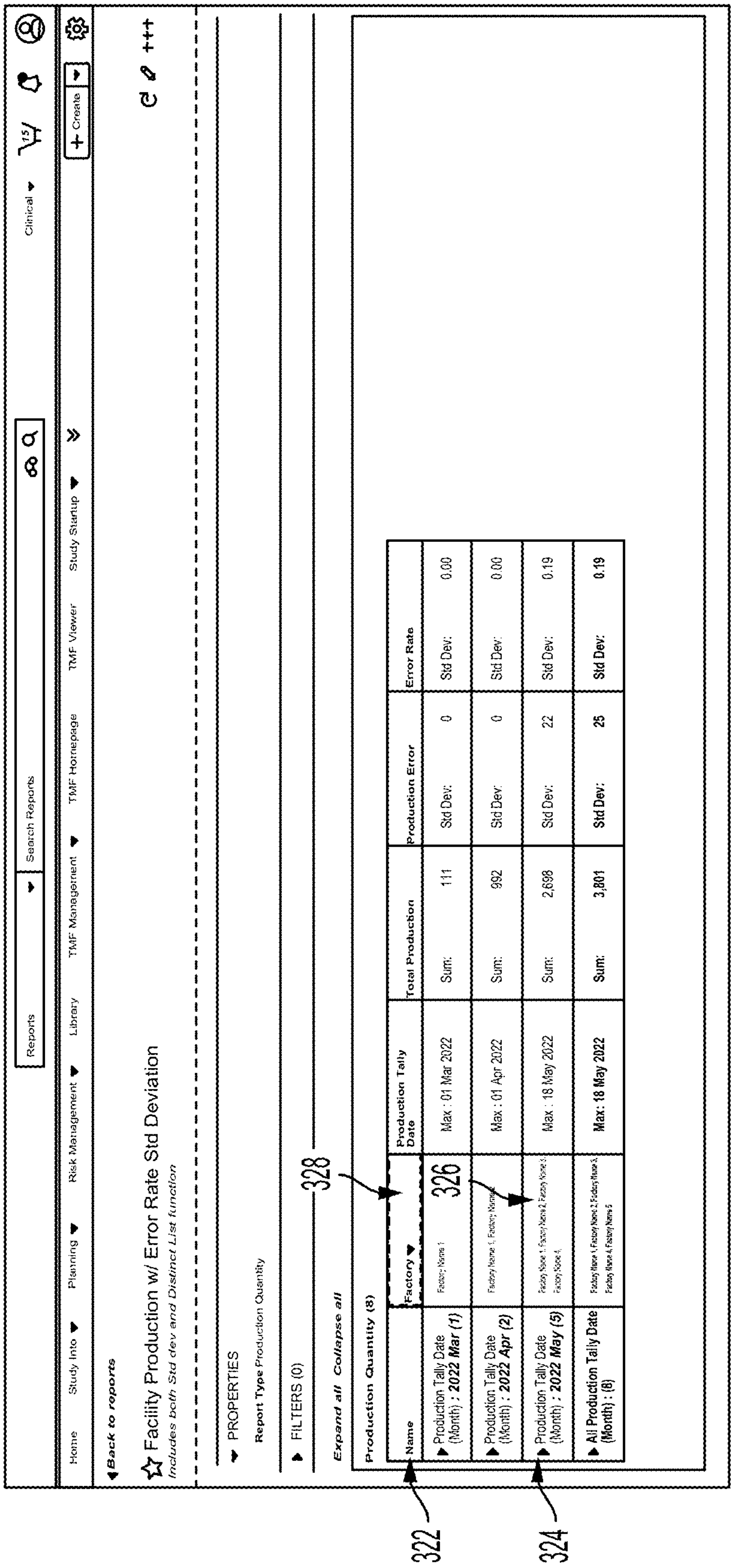
FIG. 3C illustrates an example interface with a report, according to some embodiments of the present disclosure.

FIG. 3B illustrates an example interface used to generate a standard deviation in an error rate function in a group report. A user may choose to apply the "Std Dev" 318 in a "Function" dropdown window 316 under a "Production Error" tab 314. The user may then hit the "Run" button 312 to run the reporting function and/or generate the report. The result of executing the "Std Dev" 318 function for the corresponding group report displayed in an example user interface may be shown in FIG. 3C. The results of "Std Dev" shown in FIG. 3C as the last column of the table may be the second computing operation results.

Figure 4A:
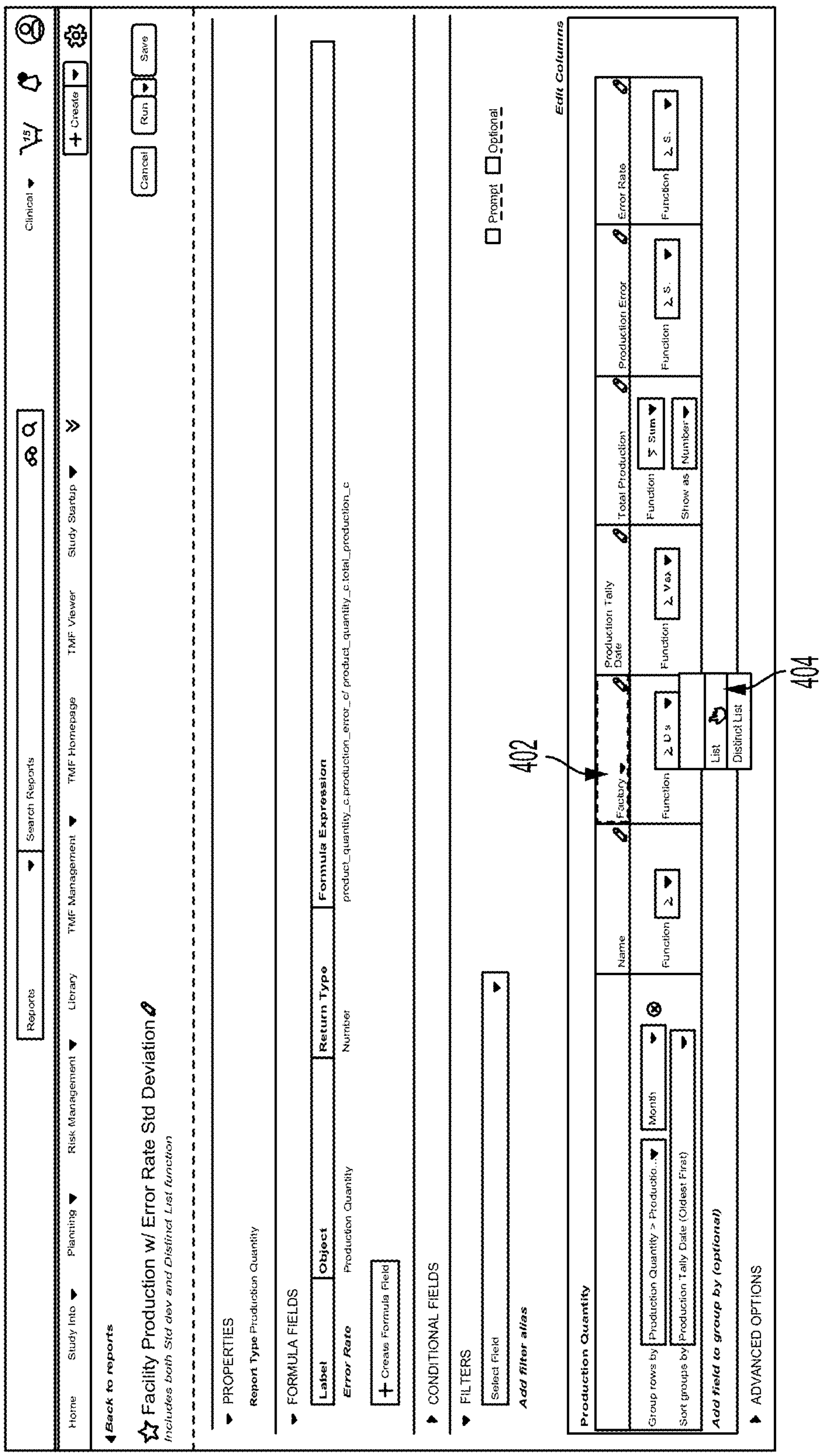
FIG. 4A illustrates an example interface used to generate a list for a report, according to some embodiments of the present disclosure.
Figure 4B:
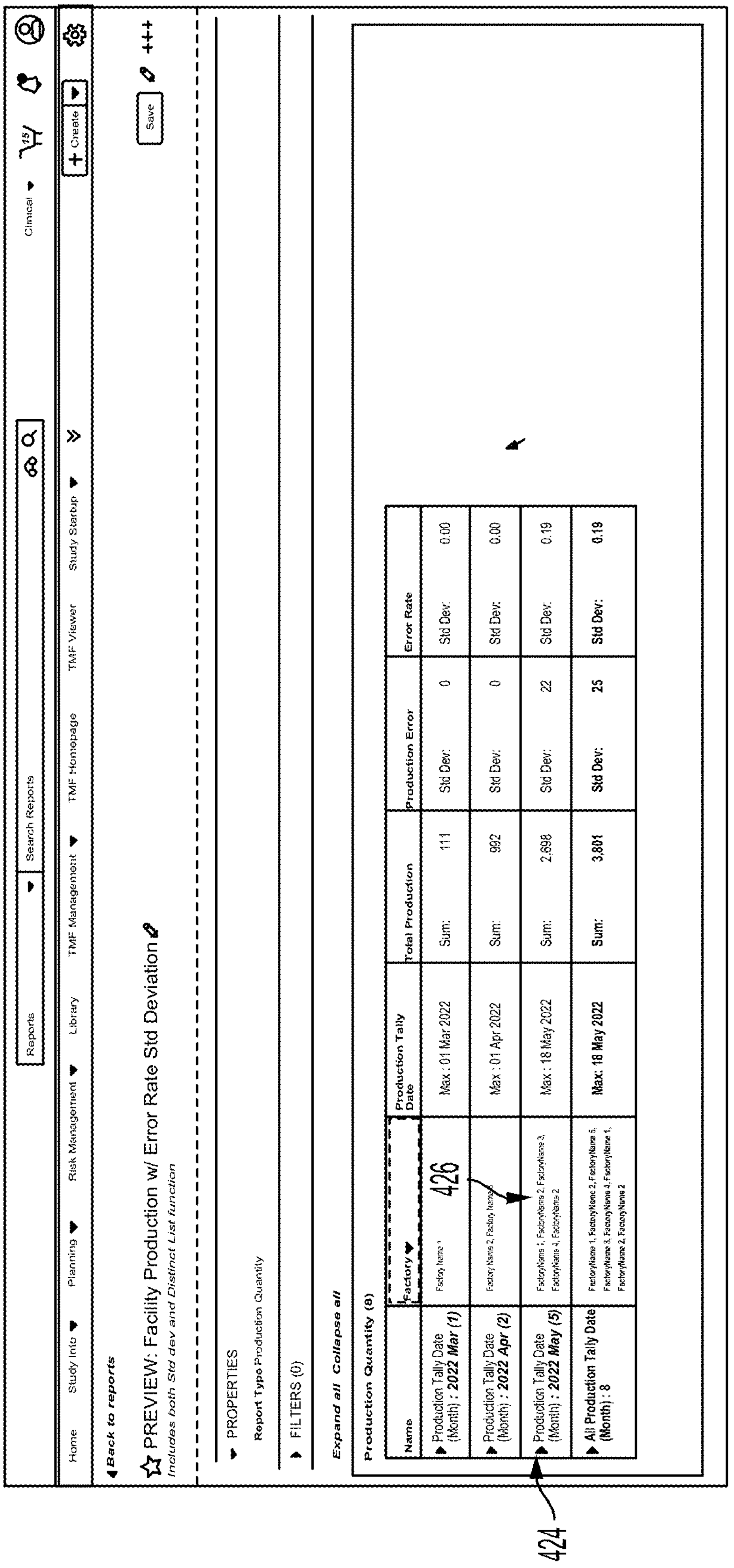
FIG. 4B illustrates an example interface with a second report, according to some embodiments of the present disclosure.

FIG. 4A illustrates an example interface used to generate a list under the Factory tab 402 in a group report, and FIG. 4B illustrates an example interface with the generated group report and the list.

Figure 5A:
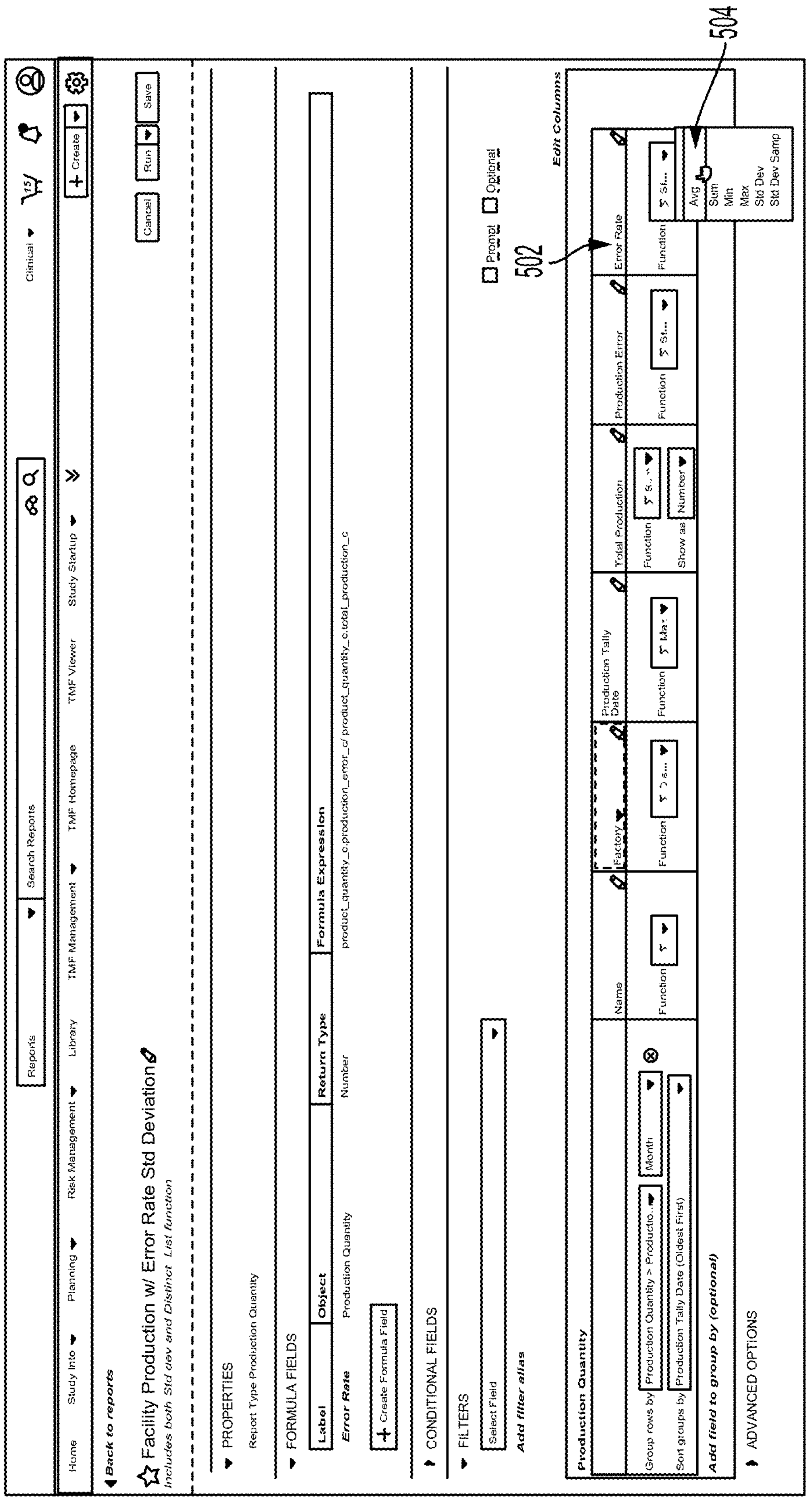
FIG. 5A illustrates an example interface used to generate an average in error rate function for a report, according to some embodiments of the present disclosure.

FIG. 5A illustrates an example interface used to apply an average function under an error rate tab in a group report. Here, the "Average" (Avg) function 504 is chosen as the Error Rate 502 instead of a Std Dev or Std Dev Samp. In FIG. 5B, the result of the average function for each group is shown in a single cell under the Error Rate tab 508 in the generated group report.

Figure 5C:
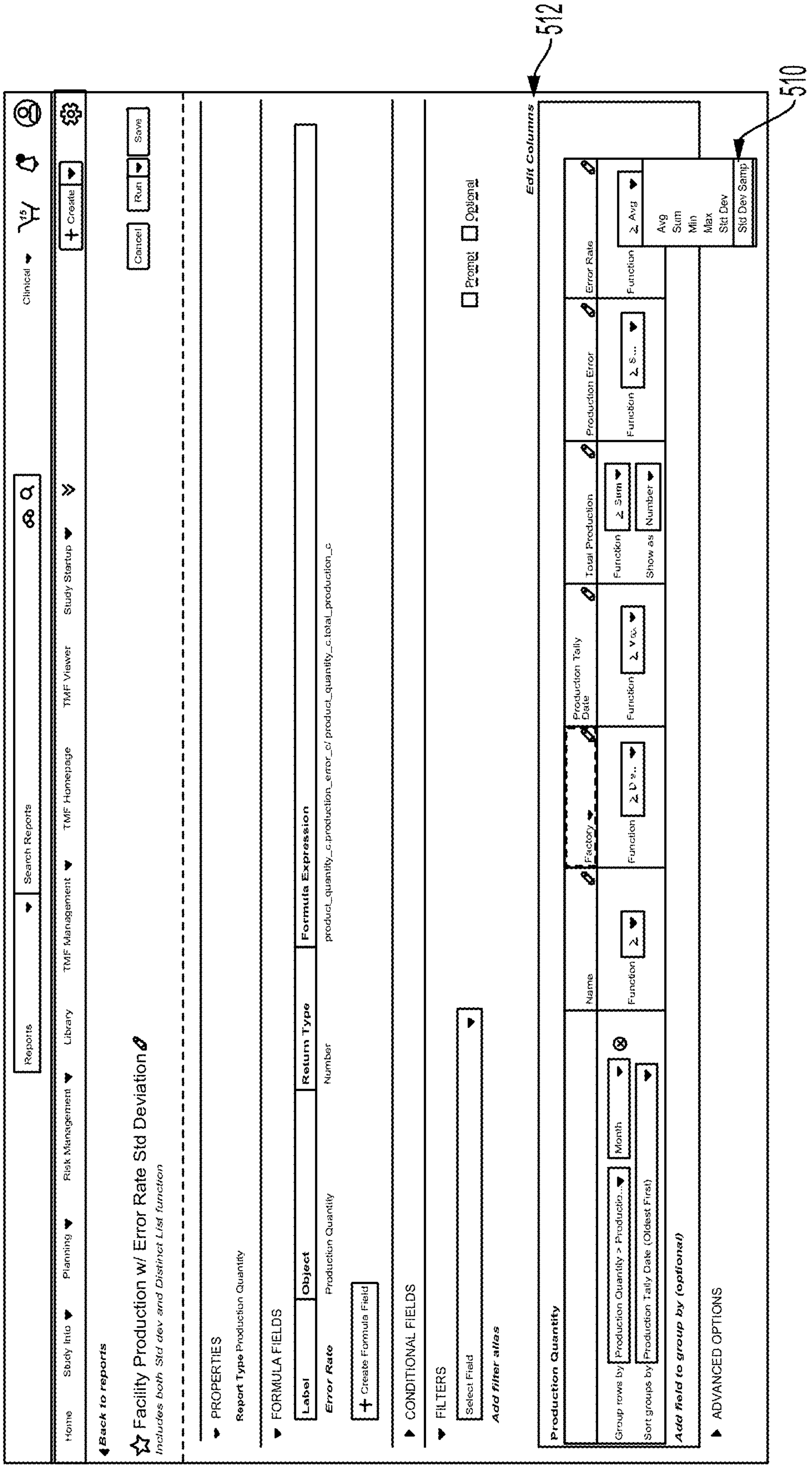
FIG. 5C illustrates an example interface used to generate a sample standard deviation in error rate function for a report, according to some embodiments of the present disclosure.

FIG. 5C illustrates an example interface used to generate a sample standard deviation using the Std Dev Samp function 510 under the Error Rate tab in a group report. FIG. 5D illustrates a resulting example interface with the Std Dev Samp 514 (i.e., second computing operation result) displayed under the Error Rate tab. Here, the result of the Std Dev Samp function for each group is displayed in a single cell under the Error Rate tab.

A first user configuration of the table, based on first user input associated with the first computing report and received prior to or after generating the first computing report, may render a first structure of the table. A second user configuration of the table, based on second user input associated with the first computing report and received prior to or after generating the first computing report, may render a second structure of the table different from the first structure of the table.

Figure 6A:
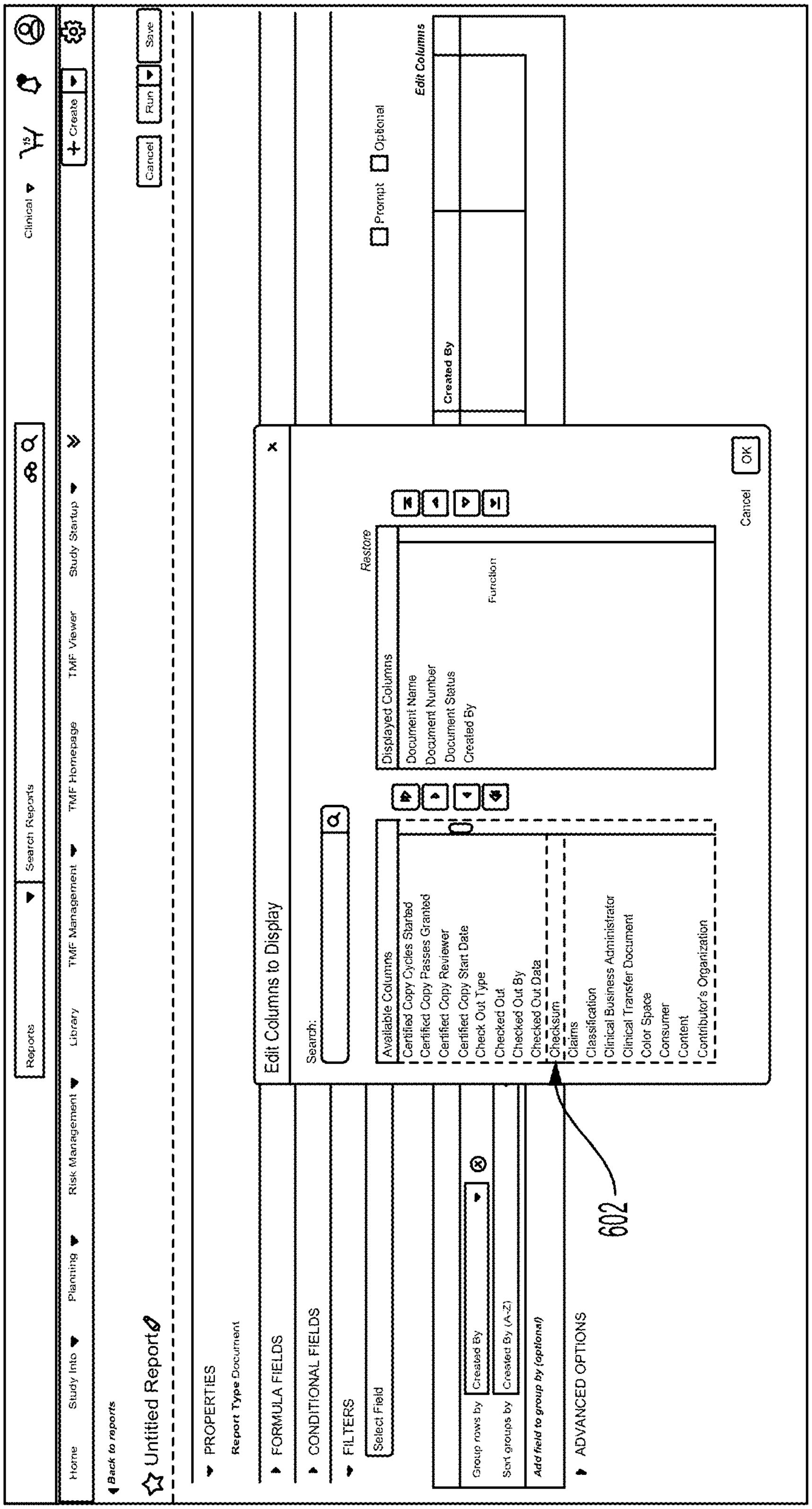
FIG. 6A illustrates an example interface used to edit columns for a report, according to some embodiments of the present disclosure.
Figure 6B:
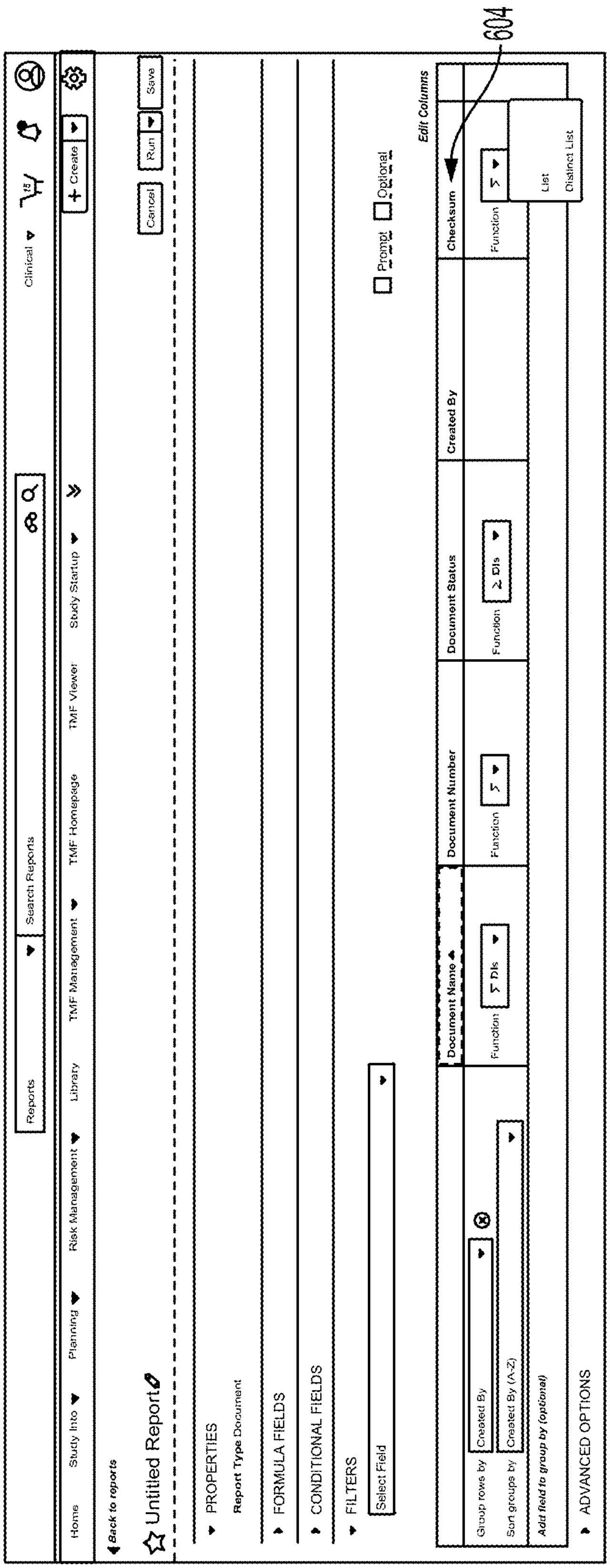
FIG. 6B illustrates an example interface used to edit functions for a report, according to some embodiments of the present disclosure.

For example, a first user configuration of the table, based on first user input at the computing device, may render a first structure of the table. And a second user configuration of the table, based on second user input at the computing device, may render a second structure of the table different from the first structure of the table. For example, FIG. 6A illustrates an example interface used to edit columns for a report, according to one embodiment. FIG. 6B illustrates an example interface used to edit functions for a report, according to one embodiment.

A user may edit a column in a report by adding, removing, or editing the column(s) in another way, thus changing the report view. As shown in FIG. 6A, a new column, "checksum," is being added to the report view. In FIG. 6B, the new "checksum" column is shown in the report view, where the user may further select an aggregate function of "List" or "Distinct List" to apply to the checksum values in report before running the reporting function. Similarly, the "checksum" column may be removed or another column may be added.

Workflow

Figure 7A:
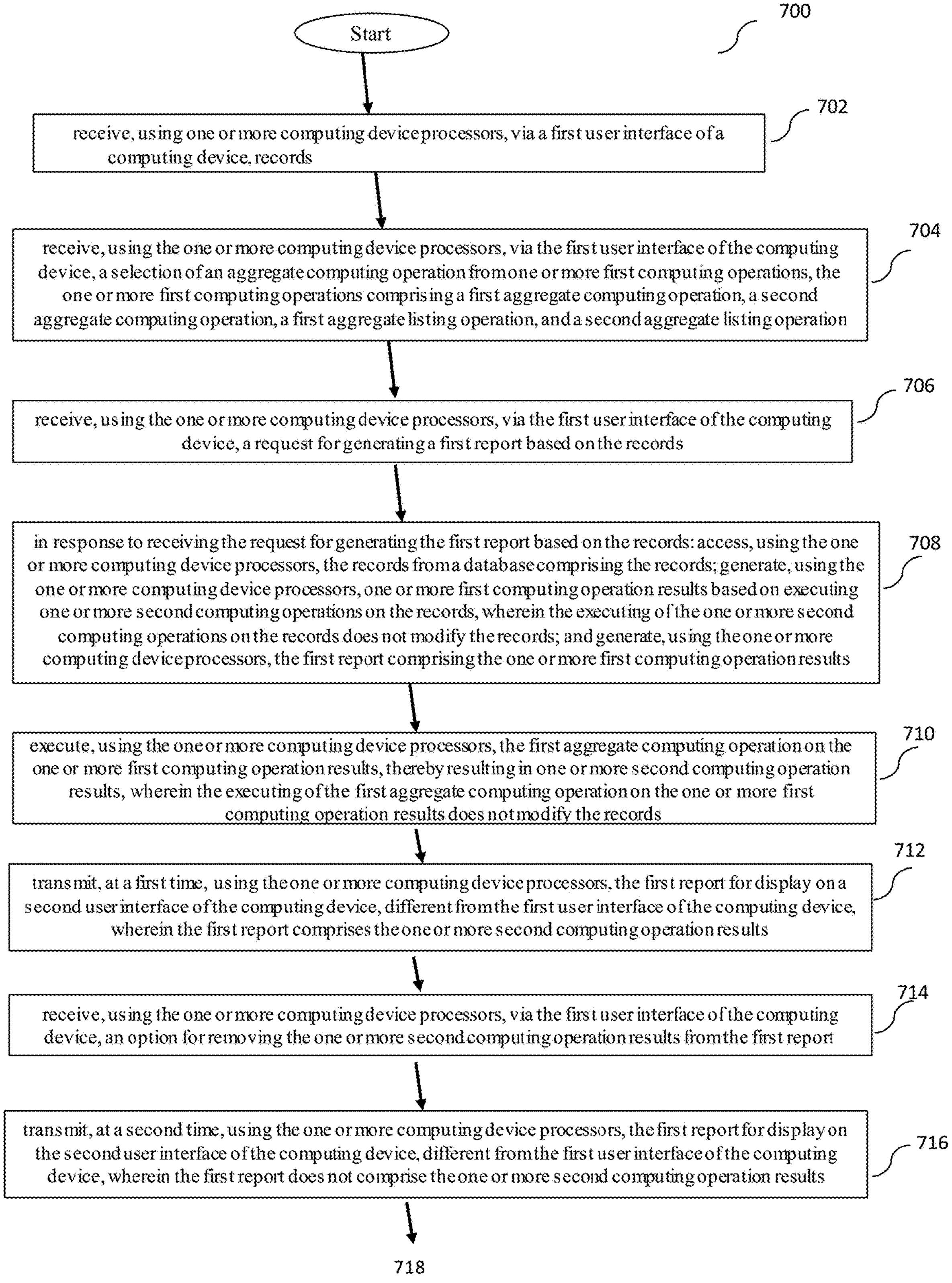
FIGS. 7A and 7B show a flowchart illustrating a method for executing aggregate computing operations for a report, according to some embodiments of the present disclosure.
Figure 7B:
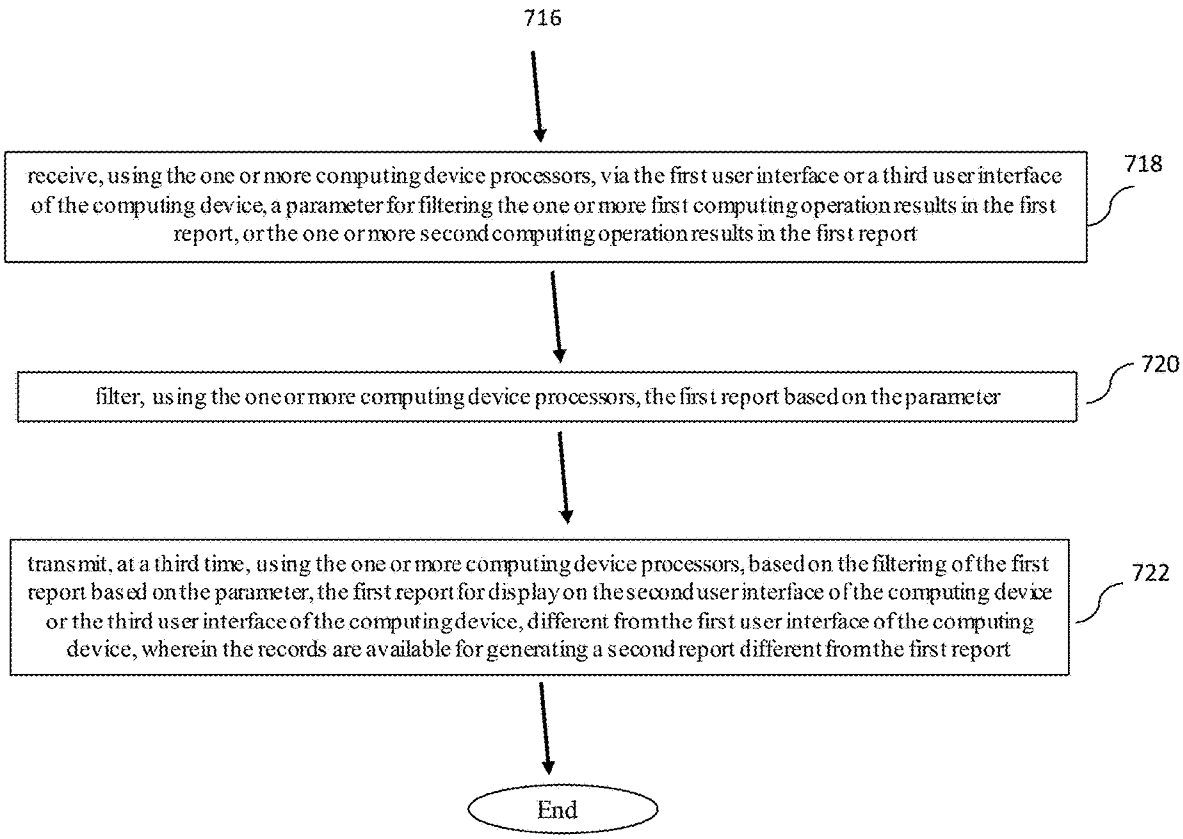

FIGS. 7A and 7B show a flowchart 700 illustrating a method 700 for executing aggregate computing operations for a report without modifying records used to generate the report in a computing network, according to one embodiment. The method may be performed by the processing unit 221 of the data management server 112, the processing unit 101 of the computing device 120*a*, . . . , or 120*n*, or another computing device processor of the data management system 100. Starting with FIG. 7A, at block 702, the method includes receiving, using one or more computing device processors, via a first user interface of a computing device, records. At block 704, the method includes receiving, using the one or more computing device processors, via the first user interface of the computing device, a selection of an aggregate computing operation from one or more first computing operations, the one or more first computing operations comprising a first aggregate computing operation, a second aggregate computing operation, a first aggregate listing operation, and a second aggregate listing operation. At block 706, the method includes receiving, using the one or more computing device processors, via the first user interface of the computing device, a request for generating a first report based on the records. At block 708, the method includes in response to receiving the request for generating the first report based on the records, accessing, using the one or more computing device processors, the records from a database comprising the records, generating, using the one or more computing device processors, one or more first computing operation results based on executing one or more second computing operations on the records, wherein the executing of the one or more second computing operations on the records does not modify the records, and generating, using the one or more computing device processors, the first report comprising the one or more first computing operation results. At block 710, the method includes executing, using the one or more computing device processors, the first aggregate computing operation on the one or more first computing operation results, thereby resulting in one or more second computing operation results, wherein the executing of the first aggregate computing operation on the one or more first computing operation results does not modify the records.

At block 712, the method includes transmitting, at a first time, using the one or more computing device processors, the first report for display on a second user interface of the computing device, different from the first user interface of the computing device, wherein the first report comprises the one or more second computing operation results. At block 714, the method includes receiving, using the one or more computing device processors, via the first user interface of the computing device, an option for removing the one or more second computing operation results from the first report. For example, instead of the Std Dev results shown in FIG. 3C, an instruction may be received to instead generate Std Dev Samp, thus resulting in removing the Std Dev results. Alternatively or additionally, the instruction may be to remove the column of error rate altogether, thus resulting in removing the Std Dev results. At block 716, the method includes transmitting, at a second time, using the one or more computing device processors, the first report for display on the second user interface of the computing device, different from the first user interface of the computing device, wherein the first report does not comprise the one or more second computing operation results.

Moving now to FIG. 7B, at block 718, the method includes receiving, using the one or more computing device processors, via the first user interface or a third user interface of the computing device, a parameter for filtering one or more of the one or more first computing operation results from the first report, or the one or more second computing operation results from the first report. For example, an instruction may be received to filter factories with a monthly production quantity (i.e., first computing operation results) below a first predetermined threshold or to filter factories with a Std Dev, under the error rate, (i.e., second computing operation results) below a second predetermined threshold. In an embodiment, this filer may be a dynamic filter. Alternatively or additionally, the records based on which the report is generated may be filtered. In other words, the records initially selected for generating the report may be filtered to generate a subset of the records. This subset of records may be called dynamic records. The subset of records, instead of the initially selected records, may be used to generate the report or to generate a second report. Or, the one or more aggregate functions may be applied to a subset of the records based on which the report is generated.

The application of the aggregate function to the subset of records or a subset of the first computing operation results in the report may be automatic or dynamic. For example, when a user input is received, the one or more first computing operation results in the report may be modified, e.g., dynamically modified, and the second computing operation results in the report may be automatically or dynamically updated without re-executing the aggregate computing operation. In an embodiment, a user may filter the second computing operation results and choose what to display in the report view by adding a dynamic filter.

At block 720, the method includes filtering, using the one or more computing device processors, the first report based on the parameter. At block 722, the method includes transmitting, at a third time, using the one or more computing device processors, based on the filtering of the first report based on the parameter, the first report for display on the second user interface of the computing device or the third user interface of the computing device, different from the first user interface of the computing device, wherein the records are available for generating a second report different from the first report.

Figure 8:
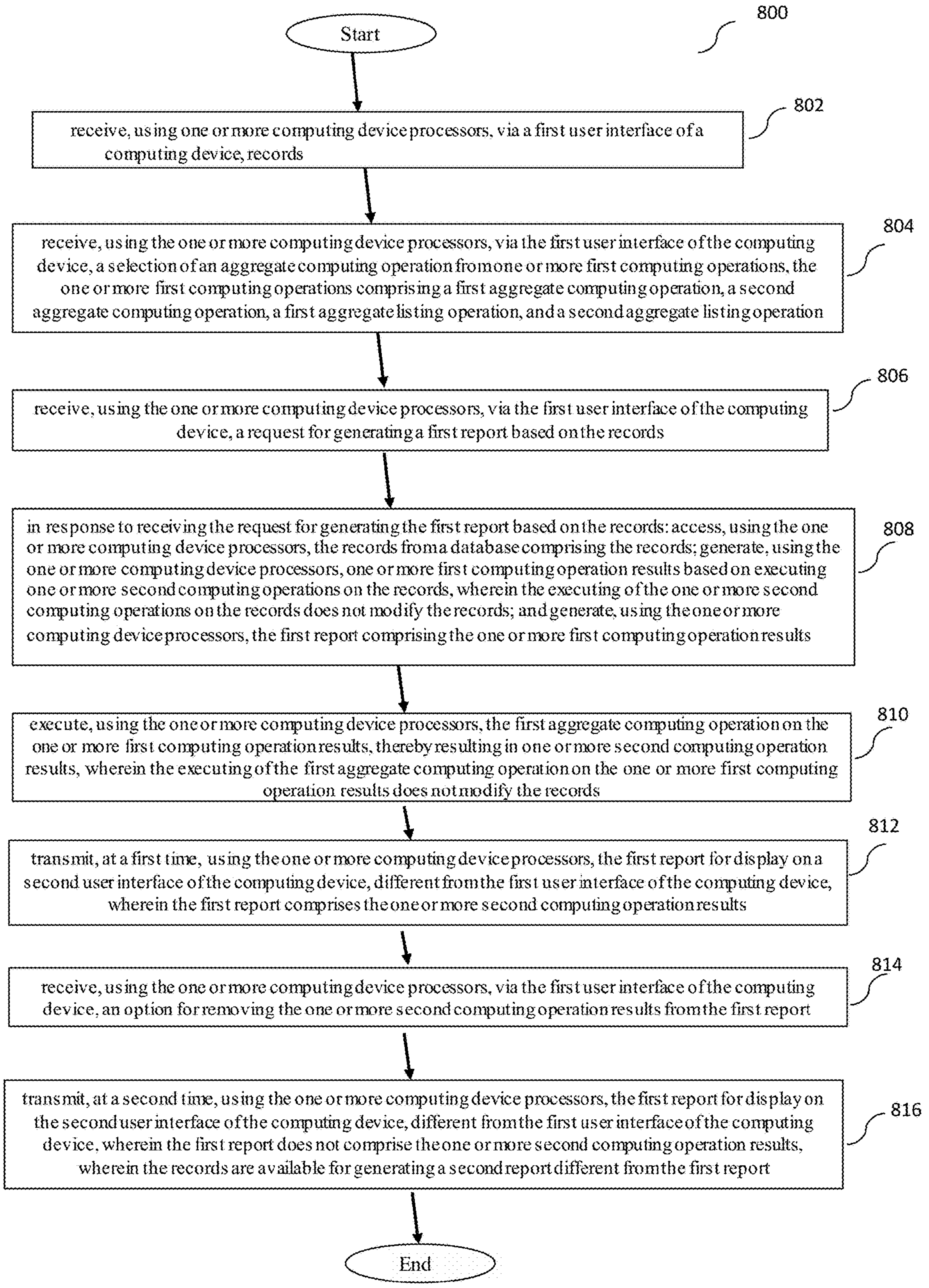
FIG. 8 shows another flowchart illustrating a method for executing aggregate computing operations for a report, according to some embodiments of the present disclosure.

FIG. 8 shows a flowchart 800 illustrating a method 800 for executing aggregate computing operations for a report without modifying records used to generate the report in a computing network, according to one embodiment. The method may be performed by the processing unit 221 of the data management server 112, the processing unit 101 of the computing device 120*a*, . . . , or 120*n*, or another computing device processor of the data management system 100. At block 802, the method includes receiving, using one or more computing device processors, via a first user interface of a computing device, records. At block 804, the method includes receiving, using the one or more computing device processors, via the first user interface of the computing device, a selection of an aggregate computing operation from one or more first computing operations, the one or more first computing operations comprising a first aggregate computing operation, a second aggregate computing operation, a first listing operation, and a second listing operation. At block 806, the method includes receiving, using the one or more computing device processors, via the first user interface of the computing device, a request for generating a first report based on the records.

At block 808, the method includes in response to receiving the request for generating the first report based on the records, accessing, using the one or more computing device processors, the records from a database comprising the records, generating, using the one or more computing device processors, one or more first computing operation results based on executing one or more second computing operations on the records, wherein the executing of the one or more second computing operations on the records does not modify the records, and generating, using the one or more computing device processors, the first report comprising the one or more first computing operation results. At block 810, the method includes executing, using the one or more computing device processors, the first aggregate computing operation on the one or more first computing operation results, thereby resulting in one or more second computing operation results, wherein the executing of the first aggregate computing operation on the one or more first computing operation results does not modify the records.

At block 812, the method includes transmitting, at a first time, using the one or more computing device processors, the first report for display on a second user interface of the computing device, different from the first user interface of the computing device, wherein the first report comprises the one or more second computing operation results. At block 814, the method includes receiving, using the one or more computing device processors, via the first user interface of the computing device, an option for removing the one or more second computing operation results from the first report. At block 816, the method includes transmitting, at a second time, using the one or more computing device processors, the first report for display on the second user interface of the computing device, different from the first user interface of the computing device, wherein the first report does not comprise the one or more second computing operation results, wherein the records are available for generating a second report different from the first report.

According to one aspect of the subject matter described in this disclosure, a method for executing aggregate computing operations for a report without modifying records used to generate the report in a computing network is provided. The method includes the following: receiving, receiving, using one or more computing device processors, via a first user interface of a computing device, a selection of records from one or more available records; receiving, using the one or more computing device processors, via the first user interface of the computing device, a selection of an aggregate computing operation from one or more first computing operations, the one or more first computing operations comprising a first aggregate computing operation, a second aggregate computing operation, a first aggregate listing operation, and a second aggregate listing operation; and receiving, using the one or more computing device processors, via the first user interface of the computing device, a request for generating a first report based on the records; in response to receiving the request for generating the first report based on the records: accessing, using the one or more computing device processors, the records from a database comprising the records; generating, using the one or more computing device processors, one or more first computing operation results based on executing one or more second computing operations on the records, wherein the executing of the one or more second computing operations on the records does not modify the records; and generating, using the one or more computing device processors, the first report comprising the one or more first computing operation results; executing, using the one or more computing device processors, the aggregate computing operation on the one or more first computing operation results, thereby resulting in one or more second computing operation results, wherein the executing of the aggregate computing operation on the records does not modify the records; and transmitting, at a first time, using the one or more computing device processors, the first report for display on a second user interface of the computing device, different from the first user interface of the computing device, wherein the first report comprises the one or more second computing operation results; receiving, using the one or more computing device processors, via the first user interface of the computing device, an option for removing the one or more second computing operation results from the first report; transmitting, at a second time, using the one or more computing device processors, the first report for display on the second user interface of the computing device, different from the first user interface of the computing device, wherein the first report does not comprise the one or more second computing operation results; receiving, using the one or more computing device processors, via the first user interface or a third user interface of the computing device, a parameter for filtering one or more of the one or more first computing operation results from the first report, or the one or more second computing operation results from the first report; filtering, using the one or more computing device processors, the first report based on the parameter; and transmitting, at a third time, using the one or more computing device processors, based on the filtering of the first report based on the parameter, the first report for display on the second user interface of the computing device or the third user interface of the computing device, different from the first user interface of the computing device, wherein the records are available for generating a second report different from the first report.

According to another aspect of the subject matter described in this disclosure, a system for executing aggregate computing operations for a report without modifying records used to generate the report in a computing network is provided. The system includes one or more computing device processors and a non-transitory computer readable storage medium storing code for execution by the one or more computing device processors. The code includes instructions to: receive via a first user interface, a selection of records from one or more available records; receive via the first user interface, a selection of an aggregate computing operation from one or more first computing operations, the one or more first computing operations comprising a first aggregate computing operation, a second aggregate computing operation, a first aggregate listing operation, and a second aggregate listing operation; receive via the first user interface, a request for generating a first report based on the records; in response to receiving the request for generating the first report based on the records: access the records from a database comprising the records; generate one or more first computing operation results based on executing one or more second computing operations on the records, wherein the executing of the one or more second computing operations on the records does not modify the records; and generate the first report comprising the one or more first computing operation results; execute the aggregate computing operation on the one or more first computing operation results, thereby resulting in one or more second computing operation results, wherein the executing of the aggregate computing operation on the records does not modify the records; and transmit, at a first time, the first report for display on a second user interface, different from the first user interface, wherein the first report comprises the one or more second computing operation results; receive via the first user interface, an option for removing the one or more second computing operation results from the first report; transmit, at a second time, the first report for display on the second user interface, different from the first user interface, wherein the first report does not comprise the one or more second computing operation results; receive, via the first user interface or a third user interface, a parameter for filtering one or more of the one or more first computing operation results from the first report, or the one or more second computing operation results from the first report; filter the first report based on the parameter; and transmit, at a third time, based on the filtering of the first report based on the parameter, the first report for display on the second user interface or the third user interface, different from the first user interface, wherein the records are available for generating a second report different from the first report.

According to another aspect of the subject matter described in this disclosure, a method for executing aggregate computing operations for a report without modifying records used to generate the report in a computing network is provided. The method includes the following: receiving, using one or more computing device processors, via a first user interface of a computing device, a selection of records from one or more available records; receiving, using the one or more computing device processors, via the first user interface of the computing device, a selection of an aggregate computing operation from one or more first computing operations, the one or more first computing operations comprising a first aggregate computing operation, a second aggregate computing operation, a first aggregate listing operation, and a second aggregate listing operation; receiving, using the one or more computing device processors, via the first user interface of the computing device, a request for generating a first report based on the records; in response to receiving the request for generating the first report based on the records: accessing, using the one or more computing device processors, the records from a database comprising the records; generating, using the one or more computing device processors, one or more first computing operation results based on executing one or more second computing operations on the records, wherein the executing of the one or more second computing operations on the records does not modify the records; and generating, using the one or more computing device processors, the first report comprising the one or more first computing operation results; executing, using the one or more computing device processors, the aggregate computing operation on the one or more first computing operation results, thereby resulting in one or more second computing operation results, wherein the executing of the aggregate computing operation on the records does not modify the records; and transmitting, at a first time, using the one or more computing device processors, the first report for display on a second user interface of the computing device, different from the first user interface of the computing device, wherein the first report comprises the one or more second computing operation results; receiving, using the one or more computing device processors, via the first user interface of the computing device, an option for removing the one or more second computing operation results from the first report; and transmitting, at a second time, using the one or more computing device processors, the first report for display on the second user interface of the computing device, different from the first user interface of the computing device, wherein the first report does not comprise the one or more second computing operation results, wherein the records are available for generating a second report different from the first report.

Reference in the specification to "one implementation" or "an implementation" means that a particular feature, structure, or characteristic described in connection with the implementation is included in at least one implementation of the disclosure. The appearances of the phrase "in one implementation," "in some implementations," "in one instance," "in some instances," "in one case," "in some cases," "in one embodiment," or "in some embodiments" in various places in the specification are not necessarily all referring to the same implementation or embodiment. In some embodiments, the terms "signal," "data," and/or "information" may be used interchangeably. In some embodiments, signals refer to non-transitory signals.

Finally, the above descriptions of the implementations of the present disclosure have been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Accordingly, the present disclosure is intended to be illustrative, but not limiting, of the scope of the present disclosure, which is set forth in the following claims.

What is claimed is:

1. A method for executing aggregate computing operations for a computing report without modifying records used to generate the computing report in a computing network, the method comprising:

receiving, using one or more computing device processors, via a first user interface of a computing device, records;

transmitting, using the one or more computing device processors, to the first user interface of the computing device, a first single dropdown menu comprising a set of aggregate computing operations, the set of aggregate computing operations comprising: a standard deviation function, a standard deviation sample function, a summation function, a maximum function, a minimum function, an average function, and a median function;

receiving, using the one or more computing device processors, via the first user interface of the computing device, a selection of a first aggregate computing operation, comprised in the set of aggregate computing operations, comprised in the first single dropdown menu;

receiving, using the one or more computing device processors, via the first user interface of the computing device, a request for generating a first computing report based on the records;

in response to receiving the request for generating the first computing report based on the records:

accessing, using the one or more computing device processors, the records from a database comprising the records;

generating, using the one or more computing device processors, one or more first computing operation results based on executing one or more second computing operations on the records, wherein the executing of the one or more second computing operations on the records does not modify the records; and generating, using the one or more computing device processors, the first computing report comprising the one or more first computing operation results;

executing, using the one or more computing device processors, the first aggregate computing operation on the one or more first computing operation results, thereby resulting in one or more second computing operation results, wherein the executing of the first aggregate computing operation on the one or more first computing operation results does not modify the records; and transmitting, at a first time, using the one or more computing device processors, the first computing report for display on a second user interface of the computing device, different from the first user interface of the computing device, wherein the first computing report comprises the one or more second computing operation results.

2. The method of claim 1, further comprising:

receiving, using the one or more computing device processors, via the first user interface of the computing device, an option for removing the one or more second computing operation results from the first computing report; and transmitting, at a second time, using the one or more computing device processors, the first computing report for display on the second user interface of the computing device, different from the first user interface of the computing device, wherein the first computing report does not comprise the one or more second computing operation results.

3. The method of claim 2, further comprising:

receiving, using the one or more computing device processors, via the first user interface or a third user interface of the computing device, a parameter for filtering the one or more first computing operation results in the first computing report, or the one or more second computing operation results in the first computing report, wherein the parameter comprises a threshold quantity associated with the one or more first computing operation results or the one or more second computing operation results;

filtering, using the one or more computing device processors, the first computing report based on the parameter; and transmitting, at a third time, using the one or more computing device processors, based on the filtering of the first computing report based on the parameter, the first computing report for display on the second user interface of the computing device or the third user interface of the computing device, different from the first user interface of the computing device, wherein the records are available for generating a second computing report different from the first computing report.

4. The method of claim 1, wherein the first aggregate computing operation comprises a standard deviation operation or a population standard deviation operation, wherein the standard deviation operation or the population standard deviation operation is applied to a full range of the one or more first computing operation results, or wherein the first aggregate computing operation comprises a sample standard deviation operation wherein the sample standard deviation operation is applied to a partial contiguous or non-contiguous range of the one or more first computing operation results.

5. The method of claim 1, further comprising transmitting, to the first user interface of the computing device, a second single dropdown menu, comprising a set of aggregate listing operations, the set of aggregate listing operations comprising: a list function and a list distinct function, wherein the list function comprises generating concatenated one or more first computing operation results, wherein the concatenated one or more first computing operation results are displayed in a single string in a single cell of a data structure, wherein a first concatenated first computing operation result among the concatenated one or more first computing operation results is separated from a second concatenated first computing operation result among the concatenated one or more first computing operation results using a separator.

6. The method of claim 1, further comprising transmitting, to the first user interface of the computing device, a second single dropdown menu, comprising a set of aggregate listing operations, the set of aggregate listing operations comprising: a list function and a list distinct function, wherein the list distinct function comprises generating concatenated one or more first computing operation results, wherein the concatenated one or more first computing operation results are displayed in a single string in a single cell of a data structure, wherein a first concatenated first computing operation result among the concatenated one or more first computing operation results is separated from a second concatenated first computing operation result among the concatenated one or more first computing operation results using a separator, wherein no duplicate of the first concatenated first computing operation result and the second concatenated first computing operation result is present among the concatenated one or more first computing operation results.

7. The method of claim 1, wherein the first computing report is displayed in a table, and wherein the table comprises a grid of cells arranged in rows and columns.

8. The method of claim 1, further comprising:

initiating, using the one or more computing device processors, rendering of a multi-dimensional visualization of the first computing report; and initiating, using the one or more computing device processors, formatting of the multi-dimensional visualization, based on an instruction received from the computing device, to enable controlling of the multi-dimensional visualization, wherein the instruction comprises a parameter of a data structure in which the first computing report is comprised or displayed, wherein the parameter comprises a threshold quantity associated with the one or more first computing operation results or the one or more second computing operation results.

9. The method of claim 1, further comprising:

receiving a user input;

in response to receiving the user input, dynamically modifying the one or more first computing operation results in the first computing report; and in response to dynamically modifying the one or more first computing operation results in the first computing report, automatically updating the one or more second computing operation results in the first computing report without re-executing the first aggregate computing operation.

10. The method of claim 1, further comprising:

receiving a user input;

in response to receiving the user input, modifying the one or more first computing operation results in the first computing report; and in response to modifying the one or more first computing operation results in the first computing report, dynamically updating the one or more second computing operation results in the first computing report without re-executing the first aggregate computing operation.

11. The method of claim 1, further comprising:

receiving a user input;

in response to receiving the user input, updating, in substantially real-time, the one or more first computing operation results in the first computing report without re-executing the one or more second computing operations; and in response to modifying the one or more first computing operation results in the first computing report, dynamically updating, in substantially real-time, the one or more second computing operation results in the first computing report without re-executing the first aggregate computing operation.

12. The method of claim 1, further comprising:

receiving a user input;

in response to receiving the user input, updating, in substantially real-time, the one or more first computing operation results in the first computing report, with or without re-executing the one or more second computing operations; and in response to modifying the one or more first computing operation results in the first computing report, dynamically updating, in substantially real-time, the one or more second computing operation results in the first computing report without re-executing the first aggregate computing operation.

13. The method of claim 1, wherein the records are selected from one or more available records.

14. The method of claim 1, further comprising:

transmitting, using the one or more computing device processors, to the first user interface of the computing device, a second single dropdown menu comprising a set of aggregate listing operations, wherein the set of aggregate listing operations further comprises a list function and a list distinct function.

15. A system for executing aggregate computing operations for a computing report without modifying records used to generate the computing report in a computing network, the system comprising:

one or more computing device processors; and a non-transitory computer readable storage medium storing code for execution by the one or more computing device processors, the code including instructions to:

receive via a first user interface, records;

transmit to the first user interface, a single dropdown menu comprising a set of aggregate computing operations, the set of aggregate computing operations comprising: a standard deviation function, a standard deviation sample function, a summation function, a maximum function, a minimum function, an average function, and a median function;

receive via the first user interface, a selection of a first aggregate computing operation, comprised in the set of aggregate computing operations, comprised in the single dropdown menu;

receive via the first user interface, a request for generating a first computing report based on the records;

in response to receiving the request for generating the first computing report based on the records:

access the records from a database comprising the records;

generate one or more first computing operation results based on executing one or more second computing operations on the records, wherein the executing of the one or more second computing operations on the records does not modify the records; and generate the first computing report comprising the one or more first computing operation results;

execute the first aggregate computing operation on the one or more first computing operation results, thereby resulting in one or more second computing operation results, wherein the executing of the first aggregate computing operation on the one or more first computing operation results does not modify the records; and transmit, at a first time, the first computing report for display on a second user interface, different from the first user interface, wherein the first computing report comprises the one or more second computing operation results.

16. The system of claim 15, wherein the first computing report is displayed in a table, and wherein the table comprises a grid of cells arranged in rows and columns.

17. The system of claim 15, wherein the code is further configured to:

receive via the first user interface, an option for removing the one or more second computing operation results from the first computing report;

transmit, at a second time, the first computing report for display on the second user interface, different from the first user interface, wherein the first computing report does not comprise the one or more second computing operation results;

receive, via the first user interface or a third user interface, a parameter for filtering the one or more first computing operation results in the first computing report, or the one or more second computing operation results in the first computing report, wherein the parameter comprises a threshold quantity associated with the one or more first computing operation results or the one or more second computing operation results;

filter the first computing report based on the parameter; and transmit, at a third time, based on the filtering of the first computing report based on the parameter, the first computing report for display on the second user interface or the third user interface, different from the first user interface, wherein the records are available for generating a second computing report different from the first computing report.

18. The system of claim 15, wherein the first computing report is displayed in a table, wherein the table comprises a grid of cells arranged in rows and columns, and wherein the table is stored in at least one of a computing device transmitting the request for generating the first computing report, a first database comprising the records, or a second database.

19. The system of claim 18, wherein a first user configuration of the table, based on first user input at the computing device, associated with the first computing report, and received prior to generating the first computing report, renders a first structure of the table, and wherein a second user configuration of the table, based on second user input at the computing device, associated with the first computing report, and received prior to generating the first computing report, renders a second structure of the table different from the first structure of the table.

20. The system of claim 15, wherein the code is further configured to:

initiate rendering of a multi-dimensional visualization of the first computing report; and initiate formatting of the multi-dimensional visualization, based on an instruction received from a computing device, to enable controlling of the multi-dimensional visualization, wherein the instruction comprises a parameter of a data structure in which the first computing report is comprised or displayed, wherein the parameter comprises a threshold quantity associated with the one or more first computing operation results or the one or more second computing operation results.

21. A method for executing aggregate computing operations for a computing report without modifying records used to generate the computing report in a computing network, the method comprising:

receiving, using one or more computing device processors, via a first user interface of a computing device, records;

transmitting, using the one or more computing device processors, to the first user interface of the computing device, a first single dropdown menu comprising a set of aggregate computing operations, the set of aggregate computing operations comprising: a standard deviation function, a standard deviation sample function, a summation function, a maximum function, a minimum function, an average function, and a median function;

receiving, using the one or more computing device processors, via the first user interface of the computing device, a selection of a first aggregate computing operation, comprised in the set of aggregate computing operations, comprised in the first single dropdown menu;

receiving, using the one or more computing device processors, via the first user interface of the computing device, a request for generating a first computing report based on the records;

in response to receiving the request for generating the first computing report based on the records:

accessing, using the one or more computing device processors, the records from a database comprising the records;

generating, using the one or more computing device processors, one or more first computing operation results based on executing one or more second computing operations on the records, wherein the executing of the one or more second computing operations on the records does not modify the records; and generating, using the one or more computing device processors, the first computing report comprising the one or more first computing operation results;

executing, using the one or more computing device processors, the first aggregate computing operation on the one or more first computing operation results, thereby resulting in one or more second computing operation results, wherein the executing of the first aggregate computing operation on the one or more first computing operation results does not modify the records;

transmitting, at a first time, using the one or more computing device processors, the first computing report for display on a second user interface of the computing device, different from the first user interface of the computing device, wherein the first computing report comprises the one or more second computing operation results;

receiving, using the one or more computing device processors, via the first user interface of the computing device, an option for removing the one or more second computing operation results from the first computing report; and transmitting, at a second time, using the one or more computing device processors, the first computing report for display on the second user interface of the computing device, different from the first user interface of the computing device, wherein the first computing report does not comprise the one or more second computing operation results, wherein the records are available for generating a second computing report different from the first computing report.

22. The method of claim 21, wherein the first aggregate computing operation comprises a standard deviation operation or a population standard deviation operation, wherein the standard deviation operation or the population standard deviation operation is applied to a full range of the one or more first computing operation results.

23. The method of claim 21, wherein the first aggregate computing operation comprises a sample standard deviation operation, wherein the sample standard deviation operation is applied to a partial contiguous or non-contiguous range of the one or more first computing operation results.

24. The method of claim 21, further comprising transmitting, to the first user interface of the computing device, a second single dropdown menu, comprising a set of aggregate listing operations, the set of aggregate listing operations comprising: a list function and a list distinct function, wherein the list function comprises generating concatenated one or more first computing operation results, wherein the concatenated one or more first computing operation results are displayed in a single string in a single cell of a data structure, wherein a first concatenated first computing operation result among the concatenated one or more first computing operation results is separated from a second concatenated first computing operation result among the concatenated one or more first computing operation results using a separator.

25. The method of claim 21, further comprising transmitting, to the first user interface of the computing device, a second single dropdown menu, comprising a set of aggregate listing operations, the set of aggregate listing operations comprising: a list function and a list distinct function, wherein the list distinct function comprises generating concatenated one or more first computing operation results, wherein the concatenated one or more first computing operation results are displayed in a single string in a single cell of a data structure, wherein a first concatenated first computing operation result among the concatenated one or more first computing operation results is separated from a second concatenated first computing operation result among the concatenated one or more first computing operation results using a separator, wherein no duplicate of the first concatenated first computing operation result or the second concatenated first computing operation result is present among the concatenated one or more first computing operation results.

26. The method of claim 21, wherein the first computing report is displayed in a table, wherein the table comprises a grid of cells arranged in rows and columns, wherein a first user configuration of the table, based on a first user input associated with the first computing report and received prior to or after generating the first computing report, renders a first structure of the table, and wherein a second user configuration of the table, based on a second user input associated with the first computing report and received prior to or after generating the first computing report, renders a second structure of the table different from the first structure of the table.

* * * * *